United States Patent
Kim et al.

(10) Patent No.: US 10,424,195 B2
(45) Date of Patent: Sep. 24, 2019

(54) TRAFFIC PREDICTION SYSTEM, VEHICLE-MOUNTED DISPLAY APPARATUS, VEHICLE, AND TRAFFIC PREDICTION METHOD

(71) Applicant: HYUNDAI MOTOR COMPANY, Seoul (KR)

(72) Inventors: ChulMin Kim, Yongin-si (KR); Dongyoul Lee, Yongin-si (KR); Young Su Kim, Yongin-si (KR); SiJun Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/087,055

(22) Filed: Mar. 31, 2016

(65) Prior Publication Data
US 2017/0116850 A1  Apr. 27, 2017

(30) Foreign Application Priority Data
Oct. 27, 2015 (KR) ........................ 10-2015-0149535

(51) Int. Cl.
| | | |
|---|---|---|
| G08G 1/01 | (2006.01) | |
| G01C 21/36 | (2006.01) | |
| G08G 1/052 | (2006.01) | |
| G08G 1/065 | (2006.01) | |
| G08G 1/0967 | (2006.01) | |
| G08G 1/0968 | (2006.01) | |

(52) U.S. Cl.
CPC ....... *G08G 1/0112* (2013.01); *G01C 21/3694* (2013.01); *G08G 1/0125* (2013.01); *G08G 1/0129* (2013.01); *G08G 1/0141* (2013.01); *G08G 1/052* (2013.01); *G08G 1/065* (2013.01); *G08G 1/096716* (2013.01); *G08G 1/096758* (2013.01); *G08G 1/096775* (2013.01); *G08G 1/096827* (2013.01); *G08G 1/096844* (2013.01); *G08G 1/096866* (2013.01)

(58) Field of Classification Search
CPC . G08G 1/0112; G08G 1/0125; G01C 21/3694
USPC ...................................................... 701/117
See application file for complete search history.

(56) References Cited

U.S. PATENT DOCUMENTS

| 8,605,698 B2 * | 12/2013 | Moeller .............. H04W 84/005 370/328 |
| 8,918,278 B2 * | 12/2014 | Feldman .............. G08G 1/0104 701/118 |

(Continued)

FOREIGN PATENT DOCUMENTS

| JP | 2000-57476 | 2/2000 |
| JP | 2010-33331 | 10/2010 |

(Continued)

*Primary Examiner* — Anne M Antonucci
*Assistant Examiner* — James E Stroud
(74) *Attorney, Agent, or Firm* — Brinks Gilson & Lione

(57) ABSTRACT

Disclosed herein are a traffic prediction system, a vehicle-mounted display apparatus, a vehicle, and a traffic prediction method. The traffic prediction system includes: a vehicle configured to acquire a driving probability for at least one drivable route; and a server apparatus configured to receive the driving probability for the at least one drivable route from the vehicle, and to calculate a volume of traffic for the at least one drivable route based on the driving probability for the at least one drivable route.

14 Claims, 19 Drawing Sheets

(56) References Cited

U.S. PATENT DOCUMENTS

| | | | |
|---|---|---|---|
| 8,989,914 B1* | 3/2015 | Nemat-Nasser | G06F 7/00 |
| | | | 340/988 |
| 9,726,505 B2* | 8/2017 | Manoliu | G01C 21/26 |
| 2005/0273215 A1* | 12/2005 | Kuge | B60T 8/17551 |
| | | | 701/1 |
| 2013/0054132 A1* | 2/2013 | Conner | G01C 21/3407 |
| | | | 701/411 |
| 2013/0155096 A1* | 6/2013 | Legair-Bradley | G06F 3/1423 |
| | | | 345/619 |
| 2013/0182906 A1* | 7/2013 | Kojo | G01S 11/12 |
| | | | 382/103 |
| 2014/0058652 A1 | 2/2014 | Duan et al. | |
| 2014/0297181 A1* | 10/2014 | Kondo | G01C 21/3658 |
| | | | 701/532 |
| 2015/0141043 A1* | 5/2015 | Abramson | G01C 21/34 |
| | | | 455/456.1 |
| 2016/0101778 A1* | 4/2016 | Hasberg | B60W 30/18154 |
| | | | 701/96 |

FOREIGN PATENT DOCUMENTS

| | | |
|---|---|---|
| JP | 2010-231557 | 10/2010 |
| JP | 2014-126372 A | 7/2014 |
| JP | 2015-042957 A | 3/2015 |
| JP | 2015-118053 A | 6/2015 |
| KR | 10-2009-0090049 A | 8/2009 |
| KR | 10-2014-0066200 | 5/2014 |
| KR | 10-2015-0082429 A | 7/2015 |

* cited by examiner

FIG. 7

| POSITION | R1 | R2 | R3 | R4 |
|---|---|---|---|---|
| LANE(r) | L4 | L3 | L2 | L1 |
| TIME(t) | 00:40' | 00:30' | 05:04' | 01:17 |

TRAFFIC PREDICTION SYSTEM, VEHICLE-MOUNTED DISPLAY APPARATUS, VEHICLE, AND TRAFFIC PREDICTION METHOD

CROSS-REFERENCE TO RELATED APPLICATION

This application claims the benefit of Korean Patent Application No. 10-2015-0149535, filed on Oct. 27, 2015 in the Korean Intellectual Property Office, the disclosure of which is incorporated herein by reference.

BACKGROUND

1. Field

Forms of the present disclosure relate to a traffic prediction system, a vehicle-mounted display apparatus, a vehicle, and a traffic prediction method.

2. Description of the Related Art

A vehicle is transport means that travels on roads or tracks to transport humans or objects to a destination. The vehicle moves through one or more wheels generally installed in the vehicle body to transport humans or objects to the destination. Examples of the vehicle include a three-wheeled or four-wheeled vehicle, a two-wheeled vehicle such as a motorcycle, construction equipment, a bicycle, and a train traveling along rails on tracks.

The vehicle may include a vehicle-mounted display apparatus. The vehicle-mounted display apparatus can provide a driver or a passenger with various necessary information, for example, information about a current position of the vehicle, information about a route to a destination, information around the vehicle, information about the speed of the vehicle, information about whether an air conditioning system operates, or various kinds of life information needed for the driver or passenger. The vehicle-mounted display apparatus may be an Audio Video Navigation (AVN) system.

Recently, the vehicle-mounted display apparatus can additionally provide information about the volume of traffic around the vehicle, a destination, or a route. If the vehicle-mounted display apparatus is a navigation system, the vehicle-mounted display apparatus decides a route to a destination in consideration of the information about the volume of traffic, and guides the driver to drive along the decided route so that the vehicle can quickly arrive at the destination by avoiding traffic congestion.

SUMMARY

Therefore, it is an aspect of the present disclosure to provide a traffic prediction system which is capable of detecting a route having a highest driving probability for a traveling vehicle, and accurately predicting the volume of traffic according to the result of the detection, a vehicle-mounted display apparatus, a vehicle, and a traffic prediction method.

Additional aspects of the disclosure will be set forth in part in the description which follows and, in part, will be obvious from the description, or may be learned by practice of the disclosure.

In accordance with one aspect of the present disclosure, a traffic prediction system includes: a vehicle configured to acquire a driving probability for at least one drivable route; and a server apparatus configured to receive the driving probability for the at least one drivable route from the vehicle, and to calculate a volume of traffic for the at least one drivable route using the driving probability for the at least one drivable route.

The vehicle may calculate a driving probability for each link of one or more links connected to at least one node to acquire the driving probability for the at least one route.

The vehicle may calculate the driving probability for each link using a lane change history of the vehicle.

The vehicle may acquire an image about a front view of the vehicle, extracts lines from the image to acquire information about lanes, and acquire the lane change history based on the information about the lanes.

The vehicle may calculate the driving probability for each link using driving vectors of the vehicle.

The vehicle may acquire information about a position of the vehicle several times, and acquire the driving vectors of the vehicle based on the information about the position of the vehicle.

The vehicle may acquire 3Dimensional (3D) coordinates about the position of the vehicle using 3D map information to acquire the information about the position of the vehicle.

The node may represent at least one of a straight road, an intersection, an overpass, an underpass, an exit, and a rotary.

The server apparatus may calculate a predicted volume of vehicles for each link based on the driving probability for each link, and calculate the volume of traffic for the at least one drivable route based on the result of the calculation.

The vehicle may calculate a driving probability for at least one link, and calculate a driving probability for each route using the driving probability for the at least one link.

The vehicle may calculate the driving probability for each route using an Electronic Horizon (EH) method.

The server apparatus may calculate a predicted volume of vehicles based on the driving probability for each route, and calculate the volume of traffic for the at least one drivable route based on the result of the calculation.

The at least one drivable route may include a route existing in a range to which the vehicle is able to travel for a predetermined time period.

The server apparatus may transmit information about the volume of traffic to the vehicle.

The traffic prediction system may further include a terminal configured to receive information about the volume of traffic from the server apparatus.

The vehicle may include a vehicle-mounted display apparatus configured to acquire the driving probability for the at least one drivable route.

In accordance with another aspect of the present disclosure, a vehicle-mounted display apparatus includes: a controller configured to acquire a driving probability for at least one route along which a vehicle is able to travel; and a communication unit configured to transmit the driving probability for the at least one route to a server apparatus.

The communication unit may receive information about a volume of traffic calculated based on the driving probability for the at least one route, from a server apparatus.

The vehicle-mounted display apparatus may further include a display unit configured to display the information about the volume of traffic.

The display unit may combine the information about the volume of traffic with map information to display the result of the combination.

The controller may calculate a driving probability for each link of one or more links connected to at least one node, using at least one of a lane change history of the vehicle and driving vectors of the vehicle, to thereby acquire the driving probability for the at least one route.

The controller may calculate a driving probability for at least one link, and calculate a driving probability for each route using the driving probability for the at least one link.

The controller may calculate the driving probability for each route using an Electronic Horizon (EH) method.

At least one route along which the vehicle is able to travel may include a route existing in a range to which the vehicle is able to travel for a predetermined time period.

BRIEF DESCRIPTION OF THE DRAWINGS

These and/or other aspects of the disclosure will become apparent and more readily appreciated from the following description of the forms, taken in conjunction with the accompanying drawings of which:

FIG. 7 is a table for describing a lane change history;

DETAILED DESCRIPTION

Hereinafter, a traffic prediction system, a vehicle-mounted display apparatus, and a vehicle according to forms of the present disclosure will be described in detail with reference to FIGS. 1 to 16.

Figure 1:
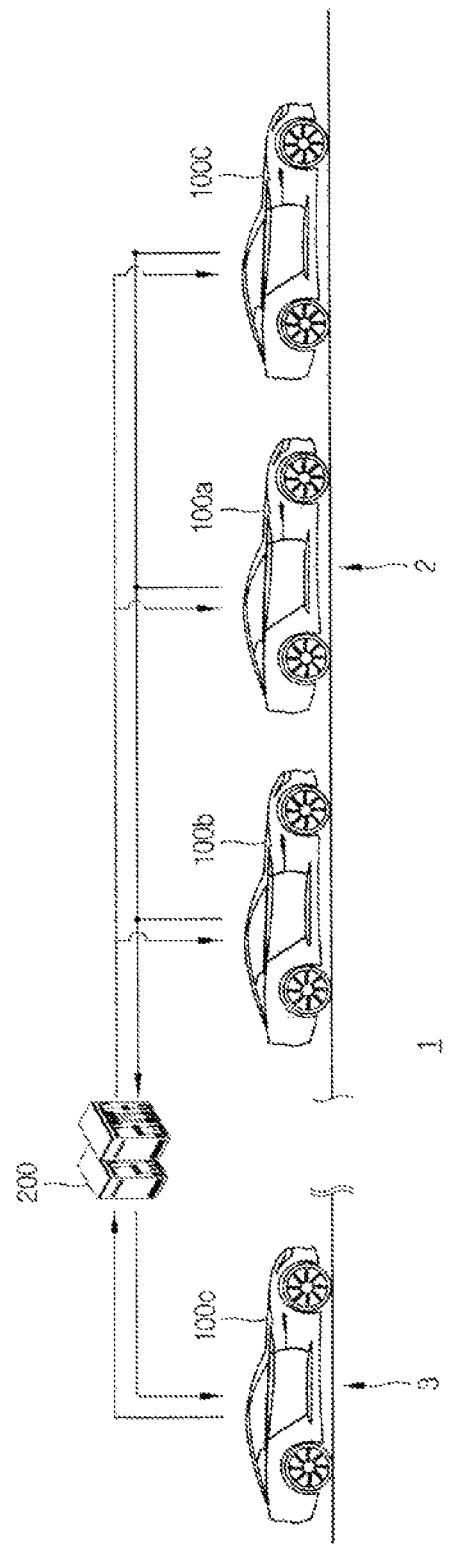
FIG. 1 shows a form of a traffic prediction system.

FIG. 1 shows a form of a traffic prediction system.

Referring to FIG. 1, a traffic prediction system 1 may include at least one vehicle 100, and a server apparatus 200 that can communicate with the at least one vehicle 100.

The vehicle 100 means transport means that can travel on roads or rails. Hereinafter, for convenience of description, the vehicle 100 is assumed to be a four-wheeled vehicle. However, the vehicle 100 is not limited to a four-wheeled vehicle. For example, the vehicle 100 may be a two-wheeled vehicle, a three-wheeled vehicle, movable construction equipment, a bicycle, or a motor bicycle.

The server apparatus 200 means a computer device that a client can access at a remote site through a predetermined network, and can perform various functions according to requests from the client. For example, the server apparatus 200 may be configured to perform various processing based on data transferred from a client, to provide various information to an accessing client, or to perform predetermined processing without receiving any request from the client, as necessary. The server apparatus 200 may perform various processing according to driving of a program for enabling the server apparatus 200 to function as a server. The server apparatus 200 may be a desktop computer, a laptop computer, or a computer apparatus specially manufactured to perform the functions of a server. Also, the server apparatus 200 may be any other device that can be considered by a designer.

The at least one vehicle 100 and the server apparatus 200 may be configured to transmit or receive various data through a predetermined communication network. In this case, the at least one vehicle 100 and the server apparatus 200 may perform mutual communication through a wireless communication network, or may perform mutual communication through both a wired communication network and a wireless communication network. Herein, the wireless communication network may be a wireless communication network established according to a predetermined mobile communication standard, such as, for example, 3rd Generation Partnership Project (3GPP), 3rd Generation Partnership Project 2 (3GPP2) or IEEE standards, or a short-range wireless communication network established according to a short-range wireless communication standard, such as Wireless Fidelity (Wi-Fi) or Zigbee communication. In some forms, the at least one vehicle 100 may communicate with the server apparatus 200 through an antenna or a communication chip installed in a vehicle controller of the vehicle 100, or may communicate with the server apparatus 200 through a navigation system separately installed in the vehicle 100.

The at least one vehicle 100 may transmit its own driving-related information to the server apparatus 200. The server apparatus 200 may acquire information about a volume of traffic of at least one road based on the driving-related information of the at least one vehicle 100, and provide the acquired information about the volume of traffic of the at least one road to the at least one vehicle 100.

The traffic prediction system 1 may include a plurality of vehicles, for example, a first vehicle 100a, a second vehicle 100b, a third vehicle 100c, and a fourth vehicle 100d. Any one vehicle, for example, the first vehicle 100a among the plurality of vehicles 100a, 100b, 100c, and 100d may only provide its own driving-related information to the server apparatus 200, or may only receive information about the volume of traffic from the server apparatus 200. Also, any one vehicle, for example, the first vehicle 100a may transmit its own driving-related information to the server apparatus 200, and also receive information about a volume of traffic from the server apparatus 200, simultaneously or at different times. Also, the plurality of vehicles, for example, the first vehicle 100a, the second vehicle 100b, and the third vehicle 100c may only transmit their own driving-related information to the server apparatus 200, and the other vehicle, for example, the fourth vehicle 100d may only receive information about a volume of traffic from the server apparatus 200. Also, all the vehicles 100a, 100b, 100c, and 100d may provide their own driving-related information to the server apparatus 200, and also receive information about a volume of traffic acquired by the server apparatus 200 from the server apparatus 200.

There may be a case in which some vehicles, for example, the first vehicle 100a, the second vehicle 100b, and the third vehicle 100c among the plurality of vehicles 100a, 100b, 100c, and 100d travel on a first road 2, and the other vehicle, for example, the fourth vehicle 100d travels on a second road 3 that is different from the first road 2 on which the first, second, and third vehicles 100a, 100b, and 100c travel. In this case, the server apparatus 200 may acquire information about a volume of traffic for the first road 2 based on information provided from the first, second, and third vehicles 100a, 100b, and 100c, and the fourth vehicle 100d traveling on the second road 3 may receive information about the first road 2 on which the fourth vehicle 100d does not travel, from the server apparatus 200.

In some forms, the server apparatus 200 may transmit the information about the volume of traffic to another server apparatus 98 or another terminal 99.

Herein, the other server apparatus 98 may be a server apparatus of a traffic information providing site, a server apparatus of a portal site, a server apparatus of a news site, a server apparatus of a road traffic management company, or a server apparatus managed by traffic polices. The server apparatus 200 may transfer information about the volume of traffic to another server apparatus so that a user, a road manager, or a traffic police accessing a traffic information providing site or a portal site can easily acquire information about the volume of traffic.

The terminal 99 may be, for example, a desktop computer or a portable terminal. The portable terminal may be, for example, a laptop computer, a smart phone, a tablet Personal Computer (PC), a Personal Digital Assistant (PDA), portable games, or a navigation system, which can display information about the volume of traffic for a user or output information about the volume of traffic as sound for a user. The user may receive the information about the volume of traffic through the terminal 99 even when he/she is not riding the vehicle 100a, 100b, 100c, or 100d.

Hereinafter, the vehicle 100 of the present disclosure will be described in more detail.

Figure 2:
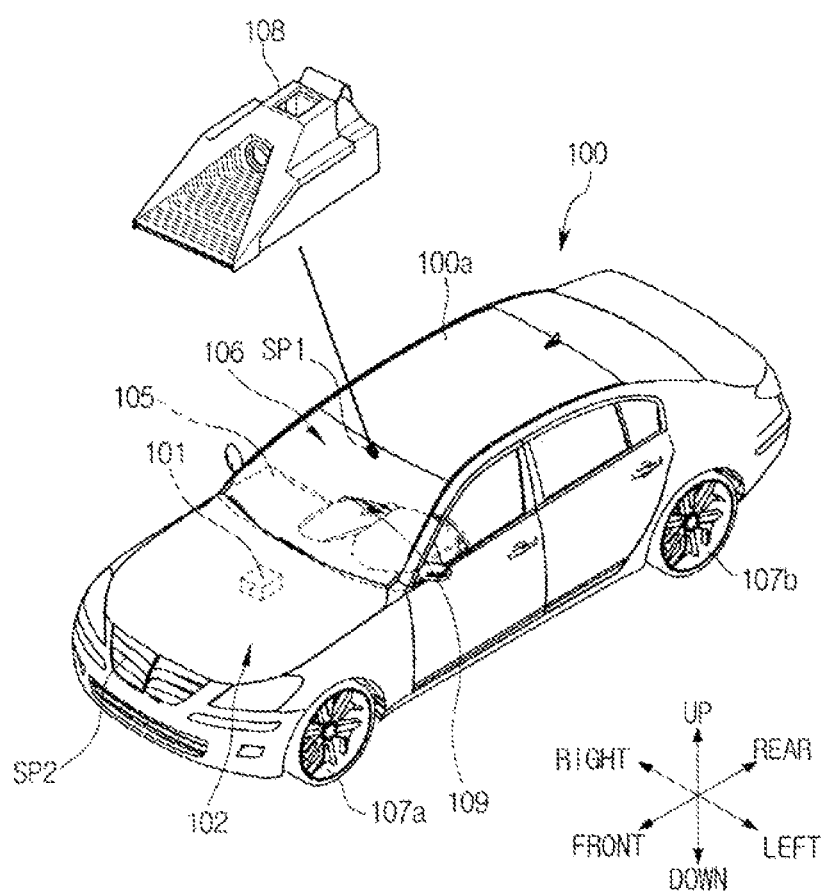
FIG. 2 shows an outer appearance of a vehicle.
Figure 3:
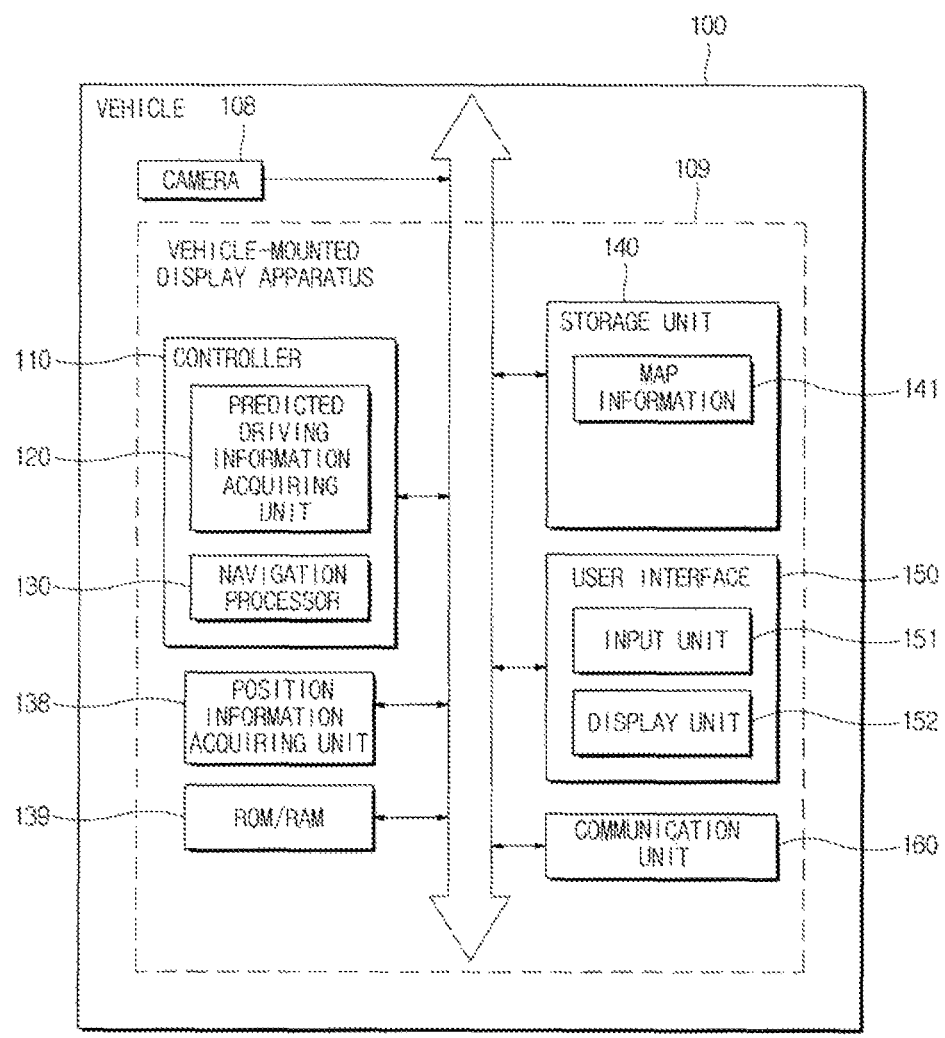
FIG. 3 is a control block diagram of a vehicle.

FIG. 2 shows an outer appearance of the vehicle 100, and FIG. 3 is a control block diagram of the vehicle 100.

In the following description, for convenience of description, a direction in which the vehicle 100 travels is defined as a front direction, and a direction that is opposite to the front direction is defined as a rear direction. Also, side directions are divided into a left direction and a right direction with respect to the front direction. If the front direction is the 12 o'clock direction, the 3 o'clock direction or a direction around the 3 o'clock direction is defined as a right direction, and the 9 o'clock direction or a direction around the 9 o'clock direction is defined as a left direction.

Referring to FIG. 2, the vehicle 100 may include an external frame 100a forming an outer appearance of the vehicle 100. In the front part of the external frame 100a, a windshield 106 configured to prevent wind from blowing into the inside of the vehicle 100 may be provided. In the inside of the windshield 106, a driver seat (not shown) and a passenger seat (not shown) may be provided. Below the windshield 106 may be provided an engine room 102, and a dashboard 105 that partitions the inside space of the vehicle 100 in which the driver seat and the passenger seat are provided.

In the vehicle 100, a vehicle controller 101 and a camera 108 may be installed, and a vehicle-mounted display apparatus 109 may be additionally installed as necessary.

The vehicle controller 101 may be provided to electronically control overall operations of the vehicle 100. The vehicle controller 101 may electrically connect to various components included in the vehicle 100 to electronically control the components of the vehicle 100. For example, the vehicle controller 101 may control operations of an air conditioning system installed in the vehicle 100, or operations of various lamps installed on the outer surface of the vehicle 100.

The vehicle controller 101 may be installed at an arbitrary location in the vehicle 100 according to a designer's selection. For example, the vehicle controller 101 may be installed between the engine room 102 and the dashboard 105, or in the inside of a center fascia in the interior of the vehicle 100. The center fascia may be located between the dashboard 105 and a gear box, and on the center fascia, various kinds of buttons may be arranged.

The vehicle controller 101 may include a processor to receive electrical signals, to process the received electrical signals, and then to output the processed electrical signals. The processor may be implemented with at least one semiconductor chip and related components. The at least one semiconductor chip and the related components may be mounted on a Printed Circuit Board (PCB) that can be installed in the inside of the vehicle 100, and then installed in the inside of the vehicle 100.

Also, in some forms, the vehicle controller 101 may include a controller 110, a position information acquiring unit 138, a main memory 139, a storage unit 140, a user interface 150, and a communication unit 160, as shown in FIG. 3. The controller 110, the position information acquiring unit 138, the main memory 139, the storage unit 140, the user interface 150, and the communication unit 160 may be implemented with a semiconductor chip, a circuit, a PCB, a communication module, and the like, and detailed descriptions thereof will be given later.

The camera 108 may acquire an image of a front or rear view of the vehicle 100. The camera 108 may be installed at one or more locations sp1 and sp2 of the vehicle 100 toward the front of the vehicle 100 in order to easily acquire an image of a front or rear view of the vehicle 100. For example, the camera 108 may be installed at a predetermined location sp1 on the inside part of the windshield 203, or at a predetermined location sp2 on a frame disposed in the inside of a radiator grill. The camera 108 may be exposed to the outside of the vehicle 100, or installed in the inside of the external frame 100a or in the inside part of the windshield 106 so as not to be directly exposed to the outside.

The camera 108 may perform photographing at a specific time to acquire a single image, or may perform photographing at regular time intervals for a predetermined time period to acquire a plurality of images. If a plurality of images is successively reproduced, moving images may be implemented.

In some forms, the camera 108 may acquire an image of lines in front of the vehicle 100. The image of the lines in front of the vehicle 100 may be transferred to a predicted driving information acquiring unit 120, and the predicted driving information acquiring unit 120 may acquire information about which lane the vehicle 100 travels on, based on the information of the lines. Herein, the lines may be solid lines or dotted lines drawn on a road to guide driving of vehicles, and the lane may be a predetermined area of a road divided by lines to allow the vehicle 100 to travel in a line on the predetermined area of the road. The lines may include a line to divide lanes on which vehicles moving in the same direction travel, and a line (for example, a central line) to divide lanes on which vehicles moving in different directions travel. The vehicle 100 can move along a lane divided by lines, or change lanes to travel along another lane, according to a driver's manipulation or a predetermined setting.

The camera 108 may include a lens to focus light, and an image pick-up device to convert light into an electrical signal, and may further include other devices as necessary. The image pick-up device may be implemented using various components, such as a Charge Coupled Device (CCD), a Complementary Metal-Oxide Semiconductor (CMOS), or a foveon.

As shown in FIG. 3, the vehicle 100 may include a vehicle-mounted display apparatus 109. The vehicle-mounted display apparatus 109 may be configured to provide various information related to the vehicle 100 to a driver or a passenger. For example, the vehicle-mounted display apparatus 109 may provide various information, such as a map, information about traffic conditions, information about a current position of the vehicle 100, a route to a destination, information about a region where the vehicle 100 is located, the speed of the vehicle 100, information about whether an air conditioning system operates, news, or all kinds of life information. The vehicle-mounted display apparatus 109 may output information in the form of sound for a user, as necessary.

The vehicle-mounted display apparatus 109 may be installed on the dashboard 105 of the vehicle 100, for example, on the upper surface of the dashboard 105. Or, the vehicle-mounted display apparatus 109 may be installed on the center fascia. Or, the vehicle-mounted display apparatus 109 may be installed on the lower part of the windshield 106, or on the back of the driver seat or the passenger seat.

As shown in FIG. 3, the vehicle-mounted display apparatus 109 may include a controller 110, a position information acquiring unit 138, a main memory 139, a storage unit 140, a user interface 150, and a communication unit 160. However, some of the above-mentioned components may be omitted. In this case, the omitted components may be implemented by other components included in the vehicle 100. For example, the position information acquiring unit 138 may be implemented by a position sensor installed between the engine room 102 and the dashboard 105.

The controller 110, the position information acquiring unit 138, the main memory 139, the storage unit 140, the user interface 150, and the communication unit 160 may transfer electrical signals through a circuit, wires, or a wireless communication network established in the vehicle-mounted display apparatus 109 to thereby transmit/receive data to/from each other. For example, the controller 110, the position information acquiring unit 138, the main memory 139, the storage unit 140, the user interface 150, and the communication unit 160 may transmit/receive data to/from each other through Controller Area Network (CAN) communication.

The controller 110 may control overall operations of the vehicle-mounted display apparatus 109. For example, the controller 110 may interpret a user command input through an input unit 151 of the user interface 150, generate a control signal for each of components of the vehicle-mounted display apparatus 109 according to the result of the interpretation, and transfer the generated control signals to the corresponding components to thereby control operations of the components. In this way, the controller 110 may control overall operations of the vehicle-mounted display apparatus 109. The controller 110 may be implemented with one or more semiconductor chips and related components. The one or more semiconductor chips and the related components may be mounted on a PCB and installed in the vehicle-mounted display apparatus 109.

In some forms, the controller 110 may include the predicted driving information acquiring unit 120 and a navigation processor 130. The predicted driving information acquiring unit 120 and the navigation processor 130 may be physically or logically separated from each other. If the predicted driving information acquiring unit 120 and the navigation processor 130 are physically separated from each other, the predicted driving information acquiring unit 120 and the navigation processor 130 may be implemented with separate semiconductor chips and related components. If the predicted driving information acquiring unit 120 and the navigation processor 130 are logically separated from each other, the predicted driving information acquiring unit 120 and the navigation processor 130 may be implemented with one or more semiconductor chips and related components.

The predicted driving information acquiring unit 120 may acquire predicted driving information to determine which driving route the currently traveling vehicle 100 will move along. More specifically, the predicted driving information may include a driving probability of the vehicle 100 for a drivable route. In this case, the predicted driving information acquiring unit 120 may calculate a driving probability for a route along which the vehicle 100 can travel, based on a current state of the vehicle 100, to acquire predicted driving information for determining how the vehicle 100 can travel. When topology is used, the drivable route may be configured with at least one link or a combination of links, and the driving probability of the vehicle 100 for the drivable route may be calculated using the link or the combination of links. This operation will be described in more detail, later.

The navigation processor 130 may decide a route to a destination using information about a current position of the vehicle 100, information about the destination, and map information, and control the vehicle-mounted display apparatus 109 to provide the user with information about the decided route to the destination. In this case, the navigation processor 130 may acquire information about a current position of the vehicle 100 through the position information acquiring unit 138, and combine the information about the current position of the vehicle 100 with map information 141 stored in the storage unit 140 to decide a route to the destination from the current position of the vehicle 100. In some forms, the navigation processor 130 may decide the route to the destination by additionally using information about the volume of traffic received through the communication unit 160. More specifically, the navigation processor 130 may decide the route to the destination from the current position of the vehicle 100 by including roads with little traffic and excluding roads with heavy traffic. In this case, the navigation processor 130 may receive the information about the volume of traffic from the server apparatus 200 through the communication unit 160. In some forms, the information about the volume of traffic may be information about the volume of traffic calculated by the server apparatus 1200 from driving probabilities of the individual vehicles 100a, 100b, 100c, and 100d, transmitted from the plurality of vehicles 100a, 100b, 100c, and 100d. After the navigation processor 130 decides the route to the destination, the navigation processor 130 may transmit a control signal to the user interface 150 to control the user interface 150 to provide information about the route to the destination to the user.

The position information acquiring unit 138 may acquire position information of an area in which the vehicle 100 is currently traveling. In some forms, the position information acquiring unit 138 may use a high precision position sensor to acquire 2Dimensional (2D) coordinates (X, Y) of the vehicle 100 on the surface of the earth, thereby acquiring information about the current position of the vehicle 100.

The position information acquiring unit 138 may be implemented with, for example, a Global Positioning System (GPS), an Assisted Global Positioning System (AGPS), or a Real Time Kinematic (RTK). The position information acquired by the position information acquiring unit 138 may be transferred to at least one of the predicted driving information acquiring unit 120, the navigation processor 130, the storage unit 140, the communication unit 160, and the user interface 150.

The main memory 139 may be implemented with Random Access Memory (RAM) or Read Only Memory (ROM), and may temporarily or non-temporarily store various data required for operations of the controller 110. For example, various information called from the storage unit 140, for example, map information 141 may be temporarily stored in the main memory 139, and then provided to the controller 110.

The storage unit 140 may be configured to store various information required for operations of the vehicle-mounted display apparatus 109. For example, the storage unit 140 may store the map information 141. The map information 141 may include a 3Dimensional (3D) map (for example, a 3D Advanced Assistance System (3D ADAS) map) that is used by the predicted driving information acquiring unit 120 to acquire an altitude of the vehicle 100 to measure an accurate position of the vehicle 100, a 2D map that is used by the navigation processor 130 to decide a route, or other various maps. The 3D ADAS map may include information about various types of roads, such as an overpass, a T-shaped road, and a underpass.

The storage unit 140 may be implemented as various storage media capable of storing data, including a semiconductor storage unit (for example, a Solid State Drive (SSD)), an optical disc storage unit (for example, Compact Disc (CD)), a magnetic disc storage unit (for example, Hard Disc Drive (HDD)), or a magnetic tape storage unit.

The user interface 150 may be configured to receive commands or data from a user or to provide various information to the user. The user interface 150 may include an input unit 151 and a display unit 152. In some forms, the user interface 150 may further include a sound output unit (not shown) to output voice or sound.

The input unit 151 may be configured to receive various commands or data from a user. For example, the input unit 151 may output a predetermined electrical signal according to a user's manipulation, and transfer the predetermined electrical signal to the controller 110 so as to control the vehicle-mounted display apparatus 109 or store various data in the storage unit 140, according to the user's command. The input unit 151 may be installed at the center fascia of the vehicle 100, at a steering wheel, or at another location in the interior of the vehicle 100. The input unit 151 may be implemented with at least one of, for example, various physical buttons such as a keyboard or direction key buttons, a knob, a touch pad, a stick type manipulation unit, and a track ball.

The display unit 152 may output a predetermined image to provide visual information to the user. The display unit 152 may display a map and information about a decided route under the control of the navigation processor 130. Also, the display unit 152 may display predicted driving information calculated by the predicted driving information acquiring unit 120, for example, a driving probability of the vehicle 100 for a specific route. Also, the display unit 152 may display only information about the volume of traffic received from the server apparatus 200 through the communication unit 160, or may combine the information about the volume of traffic with a map and a decided route to display the combined information.

In some forms, the display unit 152 may be implemented with a Cathode Ray Tube (CRT) or a display panel. Herein, the display panel may include a Liquid Crystal Display (LCD), a Light Emitting Diode (LED) display panel, an Organic Light Emitting Diode (OLED) display panel, an Active-Matrix Organic Light Emitting Diode (AMOLED) display panel, or a Cold Cathode Fluorescent Lamp (CCFL).

In some forms, the user interface 150 may include a touch screen, and the touch screen may be configured to perform all functions of the input unit 151 and the display unit 152 as described above. In some forms, the touch screen may include a resistive touch screen, a capacitive touch screen, an infrared touch screen, or an ultrasonic touch screen.

The communication unit 160 may be configured to transmit data to another external device, or to receive data from another external device. The communication unit 160 may be configured to transmit a driving probability calculated by the predicted driving information acquiring unit 120 to the server apparatus 200, or to receive information about the volume of traffic from the server apparatus 200. Also, the communication unit 160 may receive various information required for operation of the vehicle-mounted display apparatus 109, and receive various information, such as, for example, news or life information.

The communication unit 160 may include at least one communication chip and an antenna, and the at least one communication chip may be designed to communicate with an external device according to a predetermined communication standard, for example, a mobile communication standard, such as 3GPP, 3GPP2, or IEEE standards, or a short-range wireless communication standard, such as Wi-Fi or Zigbee.

Hereinafter, the predicted driving information acquiring unit 120 of the controller 110 will be described in more detail.

Figure 4:
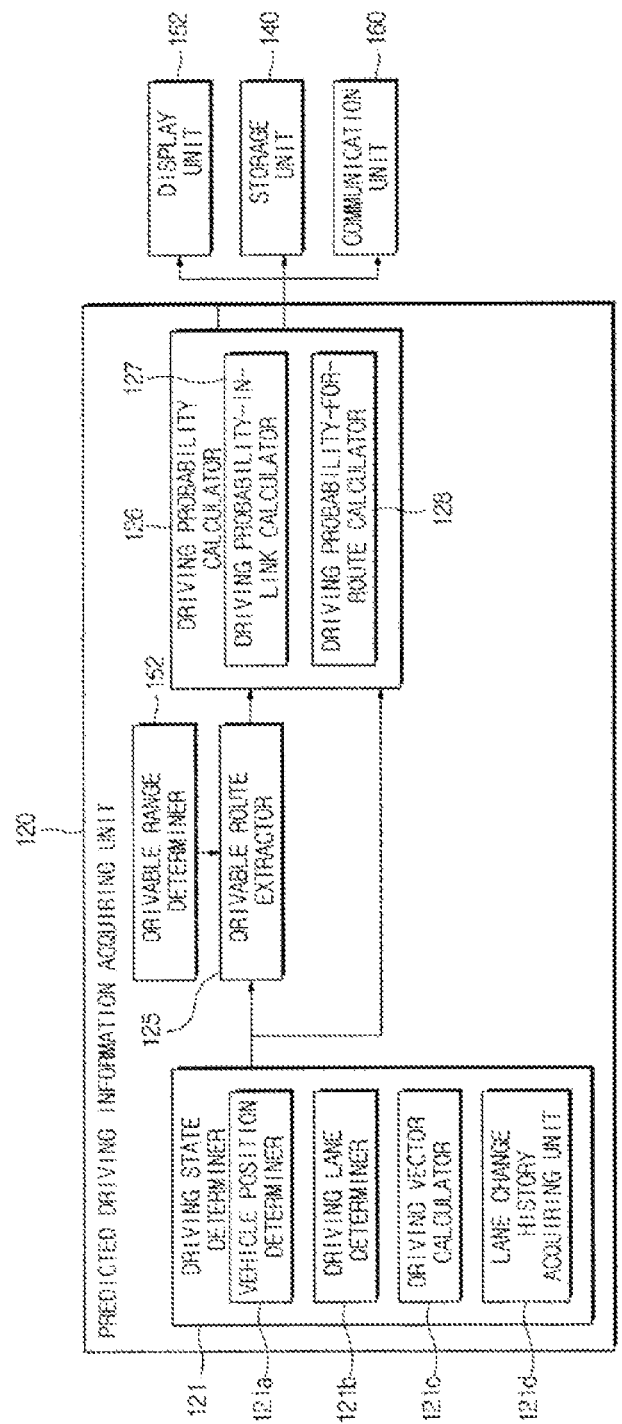
FIG. 4 is a control block diagram of a predicted driving information acquiring unit.

FIG. 4 is a control block diagram of the predicted driving information acquiring unit 120.

The predicted driving information acquiring unit 120 may include, as shown in FIG. 4, a driving state determiner 121, a drivable range determiner 124, a drivable route extractor 125, and a driving probability calculator 126. The driving state determiner 121, the drivable range determiner 124, the drivable route extractor 125, and the driving probability calculator 126 may be physically or logically separated from each other.

The driving state determiner 121 may determine or calculate a precise position (X, Y, Z) of the vehicle 100 on a road, a driving lane of the vehicle 100, driving vectors of the vehicle 100, and a lane change history of the vehicle 100. Herein, the driving vectors are vectors obtained by connecting two precise positions measured with a predetermined distance or at a constant time interval as necessary in consideration of driving speed of the vehicle 100, in time order.

In some forms, the driving state determiner 121 may include a vehicle position determiner 121a, a driving lane determiner 121b, a driving vector calculator 121c, and a lane change history acquiring unit 121d.

The vehicle position determiner 121a may measure a 2D position (X, Y) of the vehicle 100 on the surface of the earth based on data transferred from the position information acquiring unit 138, and estimate an altitude Z of the vehicle 100 using the measured 2D position (X, Y) of the vehicle 100 on the surface of the earth and a 3D map stored in the storage unit 140 to thus acquire 3D coordinates (X, Y, Z)

about the position of the vehicle 100. If the 3D coordinates of the vehicle 100 are acquired, it can be determined what road the vehicle 100 is traveling on. That is, the vehicle position determiner 121a may determine that the vehicle 100 is traveling at an area corresponding to the 3D position (X, Y, Z) of the vehicle 100 in the 3D map, and determine a road on which the vehicle 100 is currently traveling, based on information about the area, for example, based on information indicating that the area corresponds to an area of a specific road.

Figure 5:
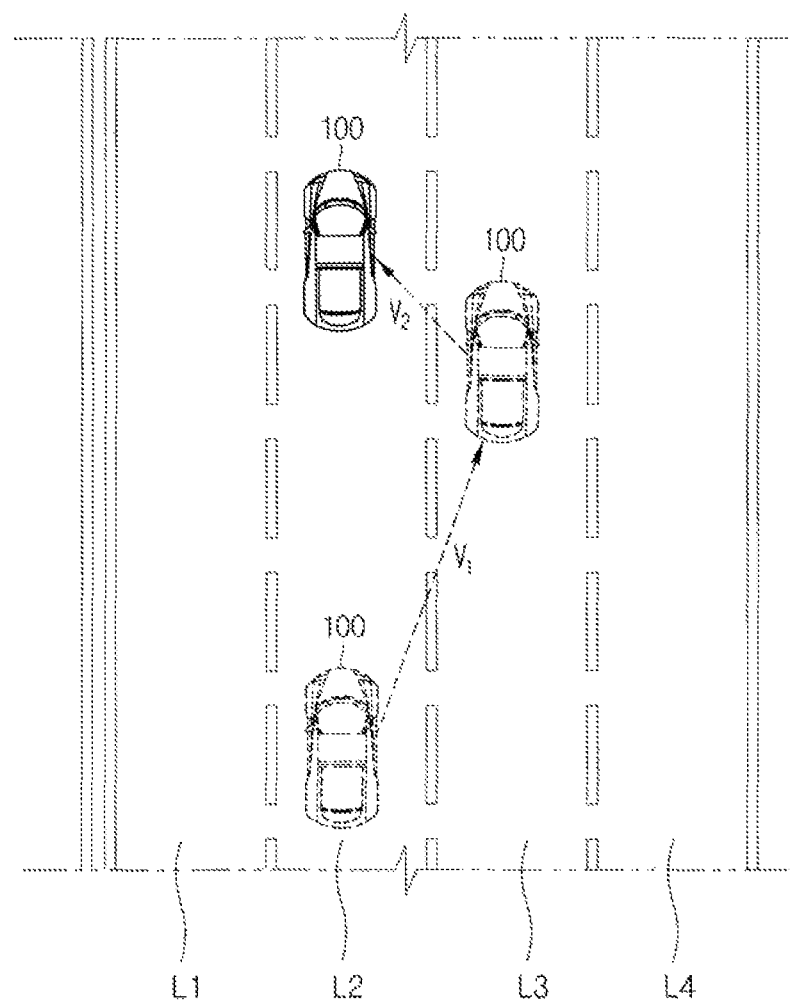
FIG. 5 is a view for describing driving vectors.

The driving lane determiner 121b may determine a driving lane (for example, any one of lanes L1 to L4 as shown in FIG. 5) based on an image about lines in front of the vehicle 100 received from the camera 108. In detail, the driving lane determiner 121b may extract lines (for example, lines L11 to L31 of FIG. 5) from the image about the lines, and determine which lane the vehicle 100 is traveling on based on the extracted lines. In this case, the driving lane determiner 121b may extract feature points, for example, borders of the lines L11 to L31, from the image, and compare the extracted feature points to stored information about lines to extract the lines L11 to L31 from the image. Also, the driving lane determiner 121b may extract the lines L11 to L31 from each of a plurality of images photographed several times, and determine whether the vehicle 100 has changed the driving lanes L1 to L4 based on changes of the lines L11 to L31 extracted from the respective images to thereby acquire real-time information about whether the vehicle 100 has changed the lanes L1 to L4. In this case, the driving lane determiner 121b may determine a current driving lane L1 to L4 of the vehicle 100, based on the 3D coordinates (X, Y, Z) about the position of the vehicle 100 acquired by the vehicle position determiner 121a and the real-time information about whether the vehicle 100 has changed the lanes L1 to L4. More specifically, if the position of the vehicle 100 is precisely measured as 3D coordinates (X, Y, Z), the driving lane determiner 121b may reflect the real-time information about whether the vehicle 100 has changed the lanes L1 to L4 to the 3D coordinates (X, Y, Z), thus determining a current driving lane L1 to L4 of the vehicle 100.

The vehicle position determiner 121a and the driving lane determiner 121b may determine 3D coordinates (X, Y, Z) about the position of the vehicle 100 and a driving lane L1 to L4 of the vehicle 100 at regular time intervals or at arbitrary selected times. In this way, the vehicle position determiner 121a and the driving lane determiner 121b may acquire 3D coordinates (for example, (X1, Y1, Z1), (X2, Y2, Z2), . . . , (Xn, Yn, Zn)) about the positions of a plurality of vehicles, and information about the lanes L1 to L4 on which the plurality of vehicles are traveling. The information acquired by the vehicle position determiner 121a and the driving lane determiner 121b may be transferred to at least one of the driving vector calculator 121c and the lane change history acquiring unit 121d. Also, the information acquired by the vehicle position determiner 121a and the driving lane determiner 121b may be transferred to the drivable lane extractor 125 and/or the driving probability calculator 126.

FIG. 5 is a view for describing driving vectors.

The driving vector calculator 121c may calculate driving vectors V1 and V2 of the vehicle 100 based on 3D coordinates (X, Y, Z) about the positions of the vehicle 100 acquired several times, as shown in FIG. 5. For example, the driving vector calculator 121c may calculate a plurality of driving vectors V1 and V2 of the vehicle 100 between a N time and a (N+1) time using 3D coordinates (Xn, Yn, Zn) of the vehicle 100 at the N time and 3D coordinates (Xn+1, Yn+1, Zn+1) of the vehicle 100 at the (N+1) time. More specifically, the driving vector calculator 121c may calculate the driving vectors V1 and V2 of the vehicle 100 between the N time and the (N+1) time, using a mathematical method of subtracting the 3D coordinates (Xn, Yn, Zn) of the vehicle 100 at the N time from the 3D coordinates (Xn+1, Yn+1, Zn+1) of the vehicle 100 at the (N+1) time. The driving vector calculator 121c may calculate the plurality of driving vectors V1 and V2, and transfer the driving vectors V1 and V2 to the drivable route extractor 125 and/or the driving probability calculator 126.

Figure 6:
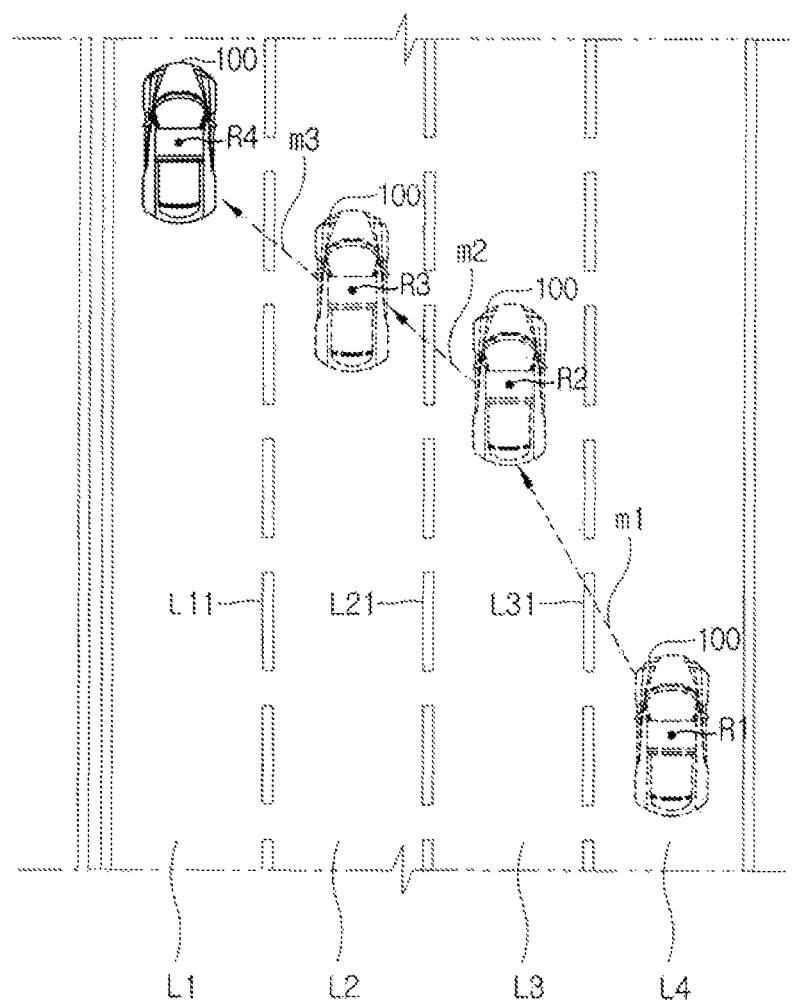
FIG. 6 is a view for describing a lane change history.

FIG. 6 is a view for describing a lane change history, and FIG. 7 is a table for describing the lane change history.

The lane change history acquiring unit 121d may acquire a lane change history based on information about the plurality of driving lanes L1 to L4. More specifically, the lane change history acquiring unit 121d may combine information acquired by the vehicle position determiner 121a with information acquired by the driving lane determiner 121b to create information about a lane change history. For example, as shown in FIGS. 6 and 7, the vehicle 100 may be located at a first position R1 on the fourth lane L4 when 40 seconds have elapsed from a reference time, and when 30 seconds have elapsed from the time when the vehicle 100 is located at the first position R1, the vehicle 100 may move from the first position R1 (m1) to be located at a second position R2 on the third lane L3. Successively, when 5 minutes 4 seconds have elapsed from the time when the vehicle 100 is located at the second position R2, the vehicle 100 may move from the second position R2 (m2) to be located at a third position R3 on the second lane L2. Then, when 1 minute 17 seconds have elapsed from the time when the vehicle 100 is located at the third position R3, the vehicle 100 may move to a fourth position R4 on the first lane L1 (m3). In this case, the lane change history acquiring unit 121d may store information about the lanes L1 to L4 corresponding to the respective positions R1 to R4, and times corresponding to the respective positions R1 to R4, to thereby create a lane change history. Herein, the times corresponding to the respective positions R1 to R4 may include times at which the vehicle 100 has arrived at the respective positions R1 to R4, times at which the vehicle 100 has departed from the respective positions R1 to R4, or time periods taken for the vehicle 100 to move to the respective positions R1 to R4. The lane change history acquired by the lane change history acquiring unit 121d may be transferred to the drivable route extractor 125 and/or the driving probability calculator 126.

Figure 8:
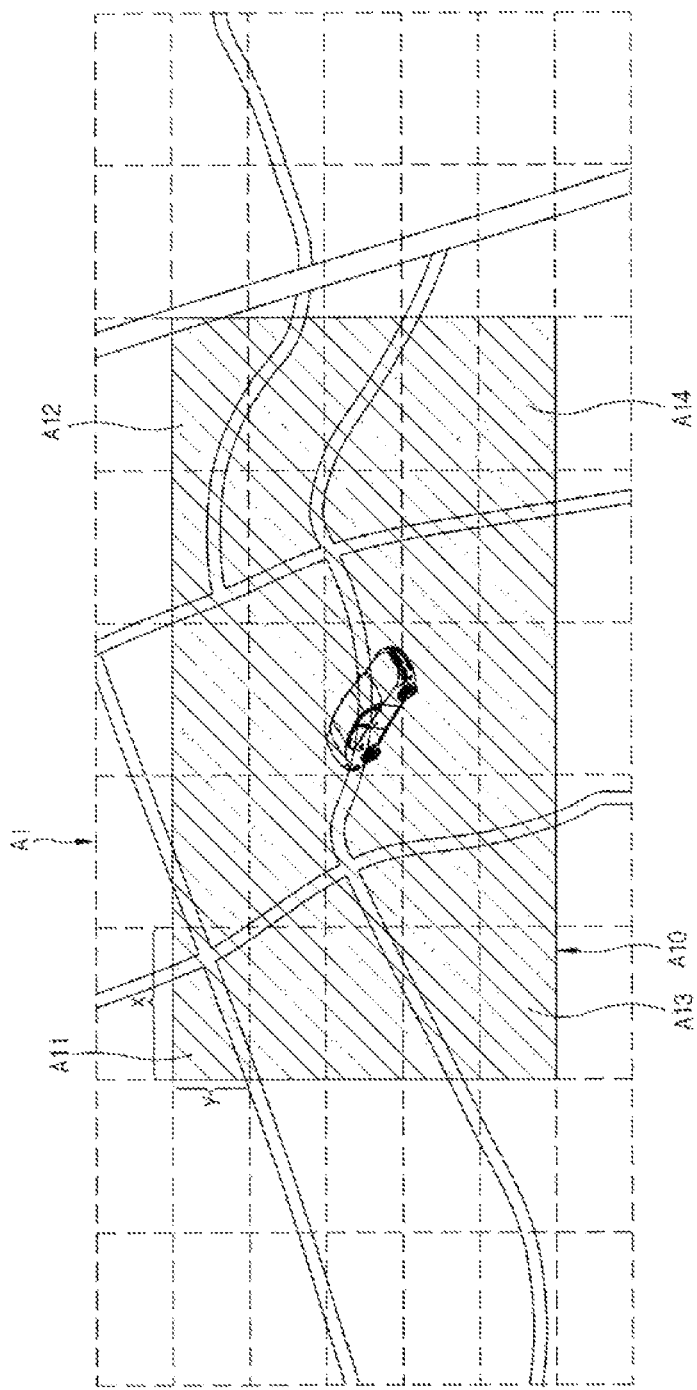
FIG. 8 shows an example of a drivable range.
Figure 9:
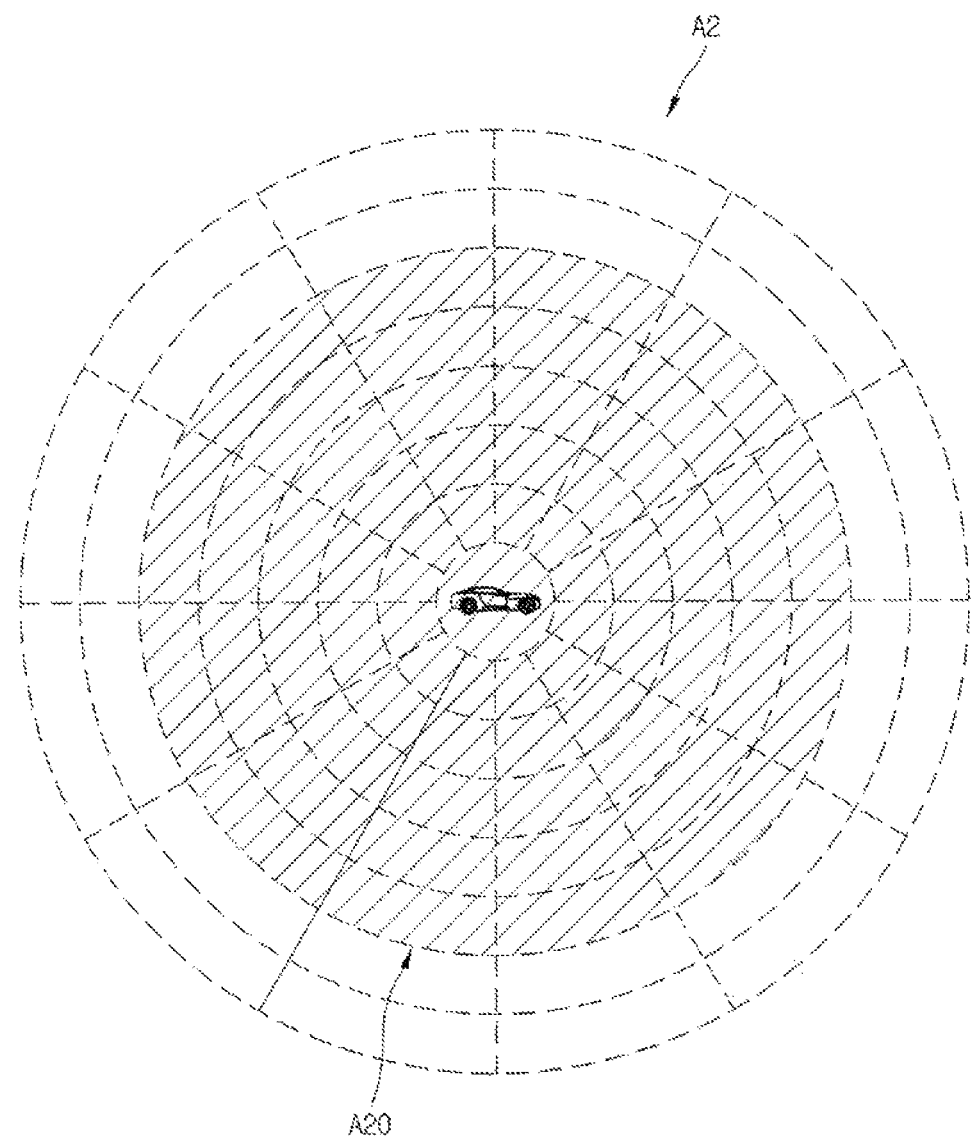
FIG. 9 shows another example of a drivable range.

FIG. 8 shows an example of a drivable range, and FIG. 9 shows another example of a drivable range.

The drivable range determiner 124 may decide a range to which the vehicle 100 can move for a predetermined time period. More specifically, a distance to which the vehicle 100 can move for a predetermined time period is limited. Accordingly, when the volume of traffic of a road is estimated based on information collected for a predetermined time period, it may be unnecessary to acquire a predicted position or route of the vehicle 100 over a wide area, and it may be sufficient to acquire a predicted position or route of the vehicle 100 in a range to which the vehicle 100 can move for a predetermined time period.

In some forms, the drivable range determiner 124 may decide, as shown in FIGS. 8 and 9, a drivable area A10 from which a predicted position or route of the vehicle 100 will be acquired within an entire area A1 that are divided into a plurality of sub areas, thereby deciding a range to which the vehicle 100 can move for a predetermined time period.

For example, as shown in FIG. 8, the entire area A1 may be configured with a plurality of sub areas each having a rectangular shape. The size of the sub area, for example, the height y or width x of the sub area may be arbitrarily decided according to a designer's selection. In this case, the drivable range determiner 124 may decide a group of sub areas surrounded by a line segment connecting a first sub area A11 to a second sub area A12, a line segment connecting the second sub area to a fourth sub area A14, a line segment connecting the fourth sub area A14 to a third sub area A13, and a line segment connecting the third sub area A13 to the first sub area A11, as the drivable area A10 from which a predicted position or route of the vehicle 100 will be acquired.

Also, as shown in FIG. 9, an entire area A2 may be configured with a plurality of sub areas that are all combined to form a circular shape. The drivable range determiner 124 may use the plurality of sub areas existing in the inside of a circle having a predetermined radius to decide a drivable area A20 from which a predicted position or route of the vehicle 100 will be acquired.

In some forms, the drivable range determiner 124 may decide the number of sub areas included in the drivable area A10, or the size (for example, the height or width of the drivable area A10) of the drivable area A10, according to a predetermined setting.

In other forms, the drivable range determiner 124 may decide the number of sub areas included in the drivable area A10, or the size (for example, the height y or width x of the drivable area A10) of the drivable area A10, according to a designer's setting.

In other forms, the drivable range determiner 124 may decide the number of sub areas included in the drivable area A10 or A20, or the size of the drivable area A10 or A20, according to predicted conditions of a road. For example, when a large volume of traffic for a road is predicted, such as during rush hours, the drivable range determiner 124 may relatively reduce the number of sub areas included in the drivable area A10 or A20, or the size of the drivable area A10 or A20, and when a small volume of traffic for a road is predicted, such as during late hours, the drivable range determiner 124 may relatively increase the number of sub areas included in the drivable area A10 or A20, or the size of the drivable area A10 or A20.

Also, the drivable range determiner 124 may decide the drivable area A10 or A20 according to a location, direction, or shape in which a road is positioned. Since the vehicle 100 travels generally along a road, a predetermined area may include positions at which the vehicle 100 can arrive, and positions at which the vehicle 100 cannot arrive, according to the location, direction, or shape in which the road is positioned. Accordingly, the drivable range determiner 124 may decide the drivable area A10 or A20 by further using road information of the map information 141.

The drivable area A10 or A20 decided by the drivable range determiner 124 may be transferred to the drivable route extractor 125.

The drivable range determiner 124 may be omitted in some forms.

The drivable route extractor 125 may extract a route along which the vehicle 100 may travel in future, in consideration of a current driving road of the vehicle 100, coordinate values about a current position of the vehicle 100, and map information. In this case, the drivable route extractor 125 may extract all routes along which the vehicle 100 may travel, over all possible ranges, or may extract one or more routes along which the vehicle 100 may travel within a predetermined range to which the vehicle 100 can move in a predetermined time period. If the drivable route extractor 125 extracts one or more routes along which the vehicle 100 may travel within a predetermined range, the drivable route extractor 125 may extract one or more routes along which the vehicle 100 may travel within the drivable area A10 or A20 decided by the drivable range determiner 124.

In some forms, the drivable route extractor 125 may use the map information 141 (for example, 3D ADAS) stored in the storage unit 140, and a current position (for example, information about a road on which the vehicle 100 is currently traveling) of the vehicle 100 to detect a road type around the vehicle 100 or in front of the vehicle 100 and then detect a drivable route based on the detected road type.

Herein, the road type may include a straight road, an intersection, such as a three-way intersection, a four-way intersection, or a five-way intersection, an overpass, a underpass, a freeway, etc. The three-way intersection may include a Y-shaped intersection and a T-shaped intersection.

More specifically, for example, if the road in front of the vehicle 100 is a freeway, the vehicle 100 will continue to run along the freeway without changing a route until a freeway exit appears. Therefore, if there is no freeway exit within the drivable area A10 or A20, the drivable route extractor 125 may determine only the freeway as a drivable route.

As another example, if a four-way intersection exists in front of the vehicle 100, the drivable route extractor 125 may determine that the vehicle can travel to three roads excluding a road on which the vehicle is currently traveling or all roads including the road on which the vehicle is currently traveling, among four roads connected to the four-way intersection, to thus extract three or four drivable routes.

As such, when the road type is determined, the drivable range determiner 124 may determine a type of a road existing within a predetermined distance range from the vehicle 100, based on the current position of the vehicle 100 and the current speed of the vehicle 100. For example, the drivable route extractor 125 may determine a type of a road existing within a wider range from the current position of the vehicle 100 as the current speed of the vehicle 100 is higher, and determine a type of a road existing within a narrower range from the current position of the vehicle 100 as the current speed of the vehicle 100 is lower.

Also, the drivable route extractor 125 may receive at least one of various information acquired by the driving state determiner 121, for example, at least one of a road on which the vehicle 100 is currently traveling, coordinate values of the current position of the vehicle 100, a lane along which the vehicle 100 is currently traveling, driving vectors of the vehicle 100, and a lane change history of the vehicle 100, and extract all routes along which the vehicle 100 is determined to be able to travel, in consideration of the received information and map information.

In some forms, the drivable range determiner 124 may extract all routes along which the vehicle 100 is determined to be able to travel, using topology.

Hereinafter, in order to describe operations of the drivable range determiner 124, nodes and links will be described.

Figure 10:
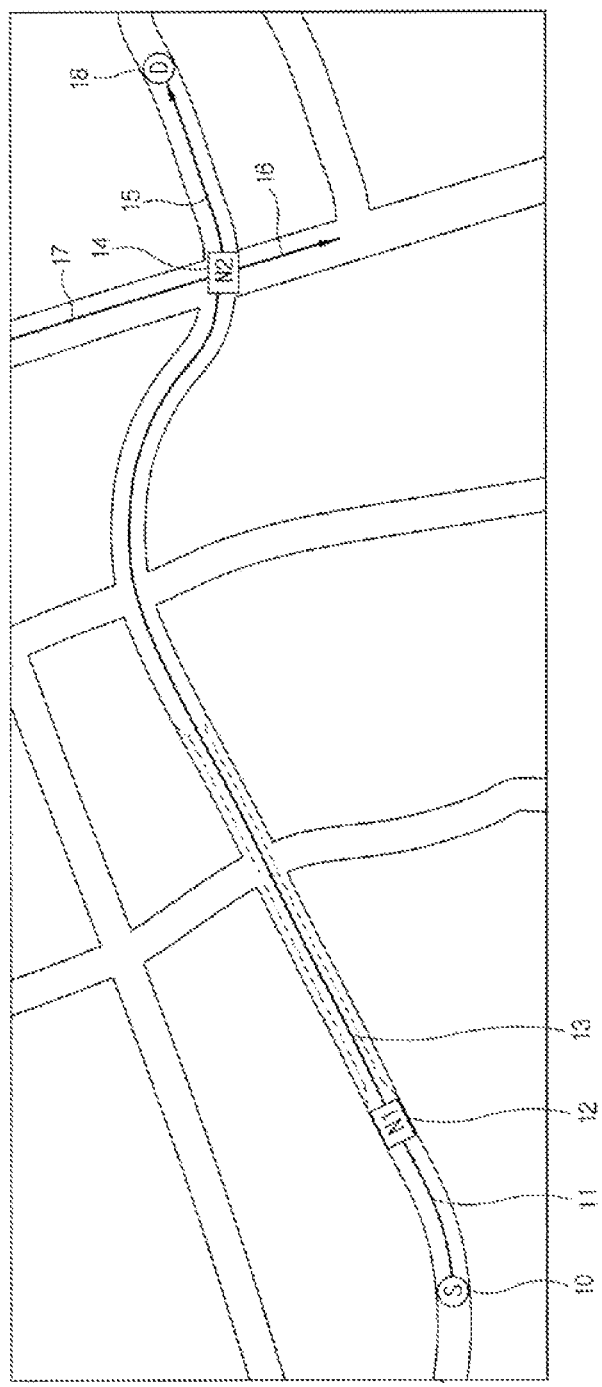
FIG. 10 is a view for describing nodes and links.
Figure 11:
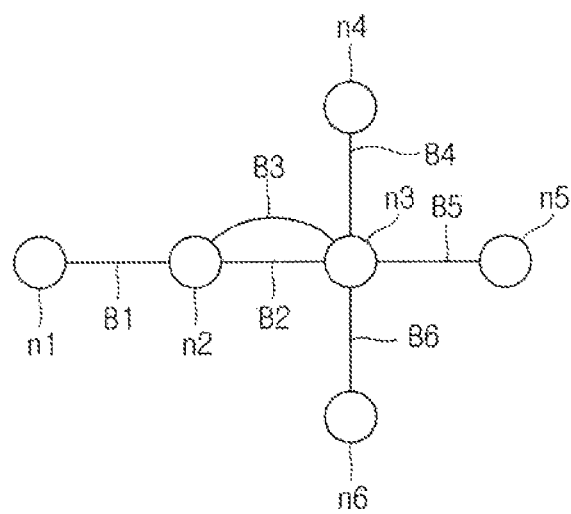
FIG. 11 shows an example of a combination of nodes and links.

FIG. 10 is a view for describing nodes and links, and FIG. 11 shows an example of a combination of nodes and links.

The node means a point such as an intersection having a predetermined feature or capable of performing a predetermined function, and the link means a line segment connecting one node to another node. For example, the node means a point such as an intersection at which a driving direction of the vehicle 100 can change, and the link means a road connecting such points. More specifically, as shown in FIG.

10, when the vehicle 100 moves from a departure point 10 to a destination 18, the vehicle 100 may travel on a road 11 at which the departure point 10 is located, enter an underpass 12, pass through a road 13 connected to the underpass 12 to arrive at a four-way intersection 14, and then travel on one road 15 of roads 15, 16, and 17 connected to the four-way intersection 14 to arrive at the destination 18. In this case, the underpass 12 and the four-way intersection 14 may correspond to nodes, and the roads 11, 13, 15, 16, and 17 on which the vehicle 100 travels may correspond to links. A road network can be conceptually expressed based on such nodes and links, as shown in FIG. 11.

As shown in FIG. 11, a node N1 (also, referred to as a first node N1) may be connected to a link B1 (also, referred to as a first link B1), and a node N2 or N3 (also, referred to as a second node N2 or a third node N3) may be connected to a plurality of links B1, B2 and B3 or B4, B5 and B6 (also, referred to as first, second, and third links B1, B2, and B3, or fourth, fifth, and sixth links B4, B5, and B6). The node N1 may be connected to the node N2 via the link B1, and the node N2 may be connected to the two nodes N2 and N3 via the plurality of links B1, B2, and B3. Also, the node N3 may be connected to three or more nodes N2, N4, N5, and N6 (also, referred to as a fourth node N4, a fifth node N5, and a sixth node N6) via three or more links B2, B3, B4, B5, and B6. Also, any one node N2 of the nodes may be connected to the other node N3 through the plurality of links B2 and B3. However, the nodes N1, N2, and N3 may be connected to each other via links in another way.

A node on a road may include, for example, a straight road, an intersection (for example, a three-way intersection, a four-way intersection, or a five-way intersection), an overpass, a underpass, a freeway exit, or a rotary. Also, the node may include a straight road or a curved road, as necessary.

If a node is a straight road, the node may be connected to two links including a forward road along which the vehicle 100 goes straight, and a backward road along which the vehicle 100 travels when it makes a U-turn. If a node is a four-way intersection, the node may be connected to four links including a road which the vehicle 100 enters when it turns right, a road on which the vehicle 100 enters when it goes straight, a road which the vehicle 100 enters when it turns left, and a road which the vehicle 100 enters when it makes a U-turn. If a node is a three-way intersection, the node may be connected to three links including a road which the vehicle 100 enters when it turns right, a road which the vehicle 100 enters when it turns left, and a road which the vehicle 100 enters when it makes a U-turn. If a node is an overpass, the node may be connected to at least two links including the overpass and a road next to the overpass which the vehicle 100 enters when it does not enter the overpass. If a node is an underpass, the node may be connected to at least two links including the underpass and a road next to the underpass. If the node is the underpass, the node may further include a link corresponding to a road which the vehicle 100 enters when it turns left or makes a U-turn. If a node is a freeway exit, the node may be connected to two links including a freeway and a road for entering the freeway exit.

A route may be formed by combining at least one of such a node and link. For example, a route may be formed by combining at least one node with at least one link. Also, when the vehicle 100 travels on a road disallowing a U-turn, a route may be formed with a link, that is, a road.

The drivable route extractor 125 may extract one or more nodes and one or more links on a road, and combine the nodes with the links to extract and acquire one or more drivable routes. For example, if the vehicle 100 is determined to be located on a load corresponding to the second link B2 connecting the second node N2 to the third node N3, the drivable route extractor 125 may extract three routes as drivable routes of the vehicle 100. More specifically, the drivable route extractor 125 may extract a route for moving to the fourth node N4 via the third node N3 and the fourth link B4, a route for moving to the fifth node N5 via the third node N3 and the fifth link B5, and a route for moving to the sixth node N6 via the third node N3 and the sixth link B6. In this case, the drivable route extractor 125 may determine that the vehicle 100 is located on a road corresponding to the second link B2, based on a road on which the vehicle 100 is currently traveling and/or coordinate values of a current position of the vehicle 100, acquired by the driving state determiner 121.

The drivable routes extracted by the drivable route extractor 125 may be transferred to the driving probability calculator 126.

The driving probability calculator 126 may calculate a driving probability of the vehicle 100 for each drivable route, based on the drivable routes extracted by the drivable route extractor 125, and at least one of various information acquired by the driving state determiner 121, for example, a road on which the vehicle 100 is currently traveling, coordinate values of the current position of the vehicle 100, a lane along which the vehicle 100 is currently traveling, driving vectors of the vehicle 100, and a lane change history of the vehicle 100.

In some forms, the driving probability calculator 126 may include at least one of a driving probability-in-link calculator 127 and a driving probability-for-route calculator 128, as shown in FIG. 4.

For example, the driving probability-in-link calculator 127 may calculate a driving probability in each link based on the drivable routes and the lane change history. As another example, the driving probability-in-link calculator 127 may calculate a driving probability in each link based on the drivable routes and driving vectors (for example, driving vectors V1 to V6 of FIG. 13).

Figure 12:
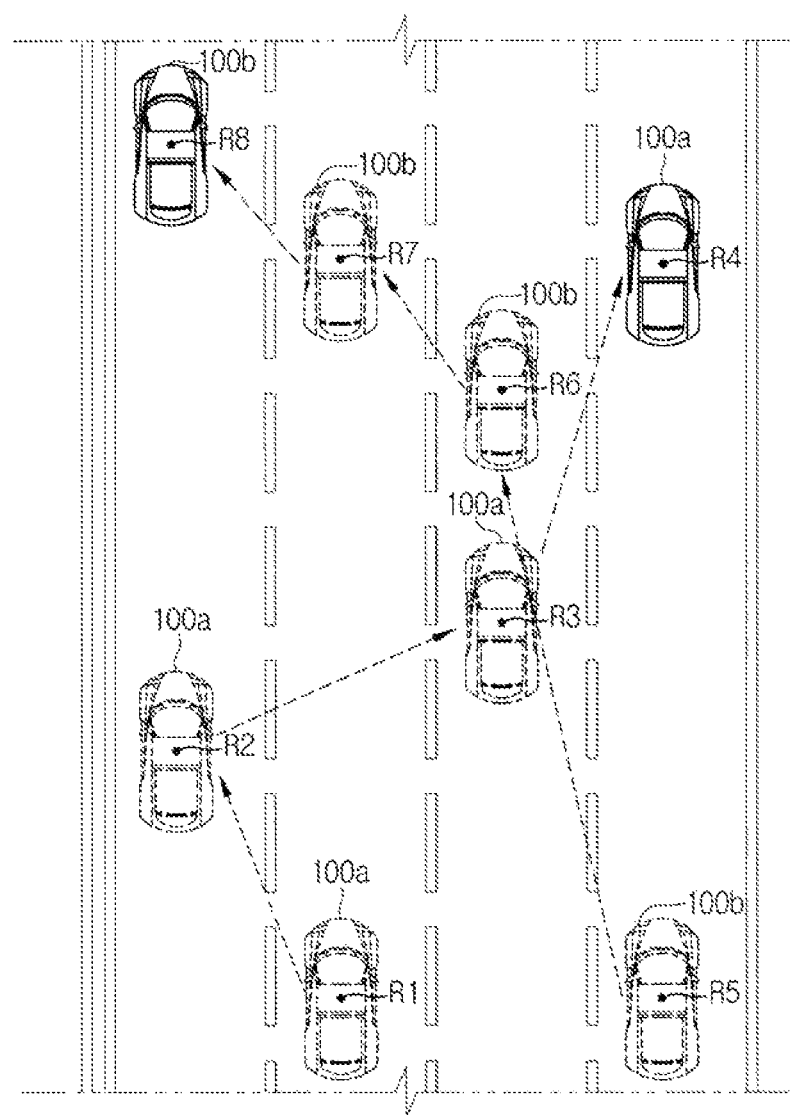
FIG. 12 is a view for describing an example of calculating a driving probability in a link based on a lane change history.

FIG. 12 is a view for describing an example of calculating a driving probability in a link based on a lane change history.

The driving probability-in-link calculator 127 may reflect a type of a node located in front of a vehicle 100a or 100b (also, referred to as a first vehicle 100a or a second vehicle 100b) and a lane change history of the vehicle 100a or 100b to calculate a driving probability for each route.

When the vehicle 100a or 100b travels on a road, a node n2, for example, a four-way intersection may exist in front of the vehicle 100a or 100b. In this case, the vehicle 100a or 100b may change a lane L1 to L4 (also, referred to as a first lane L1, a second lane L2, a third lane L3, and a fourth lane L4), as shown in FIG. 12. For example, the first vehicle 100a may move from a first position R1 to a fourth position R4 in such a way to enter the second lane L2, the first lane L1, the third lane L3, and the fourth lane L4, sequentially. If the first vehicle 100a travels for 59 seconds on the second lane L2, travels for 3 minutes 47 seconds on the first lane L1, travels for 4 seconds on the third lane L3, and travels for 10 minutes 22 seconds on the fourth lane L4, it may be determined that the first vehicle 100a abruptly moved from the first lane L1 to the fourth land L4. Accordingly, it may be determined that there is a high probability that a driver of the first vehicle 100a intends to turn right. The driving probability-in-link calculator 127 may reflect the movement of the vehicle 100a to decide a high probability that the vehicle 100a turns right at the four-way intersection n2 and a low probability that the vehicle 100a turns left at the four-way intersection n2. Also, the second vehicle 100b may move from a fifth position R5 to an eight position R8 via a sixth position R6 and a seventh position R7. In this case, the second vehicle 100b may move from the fourth lane L4 to the first lane L1 sequentially. The driving probability-in-link calculator 127 may reflect the movement of the second vehicle 100b to decide a high probability that the second vehicle 100b turns left at the four-way intersection n2 and a low probability that the second vehicle 100b turns right at the four-way intersection n2.

When a lane change history is used, the driving probability-in-link calculator 127 may calculate a driving probability in each link according to Equation (1), below.

$$P_{link} = F(\text{NodeType}, r_1, t_1, \ldots, r_n, t_n) \quad (1)$$

In Equation (1), $P_{link}$ represents a driving probability in a predetermined link, Node Type represents a type of a node, $r_1, \ldots, r_n$ represents the position of the vehicle 100, and $t_1, \ldots, t_n$ represents a time period (also, referred to as a lane maintenance time period) for which the vehicle 100 travels along a lane without changing the lane. F( ) is a function for calculating a driving probability according to the above-mentioned variables. In other words, a driving probability in a predetermined link may be decided based on a node in front, a lane change history of the vehicle 100 before the vehicle 100 enters the node in front, and a function of a lane maintenance time period. The F( ) function of Equation (1) may be arbitrarily decided according to a designer's selection, for example, according to experience rule.

Figure 13:
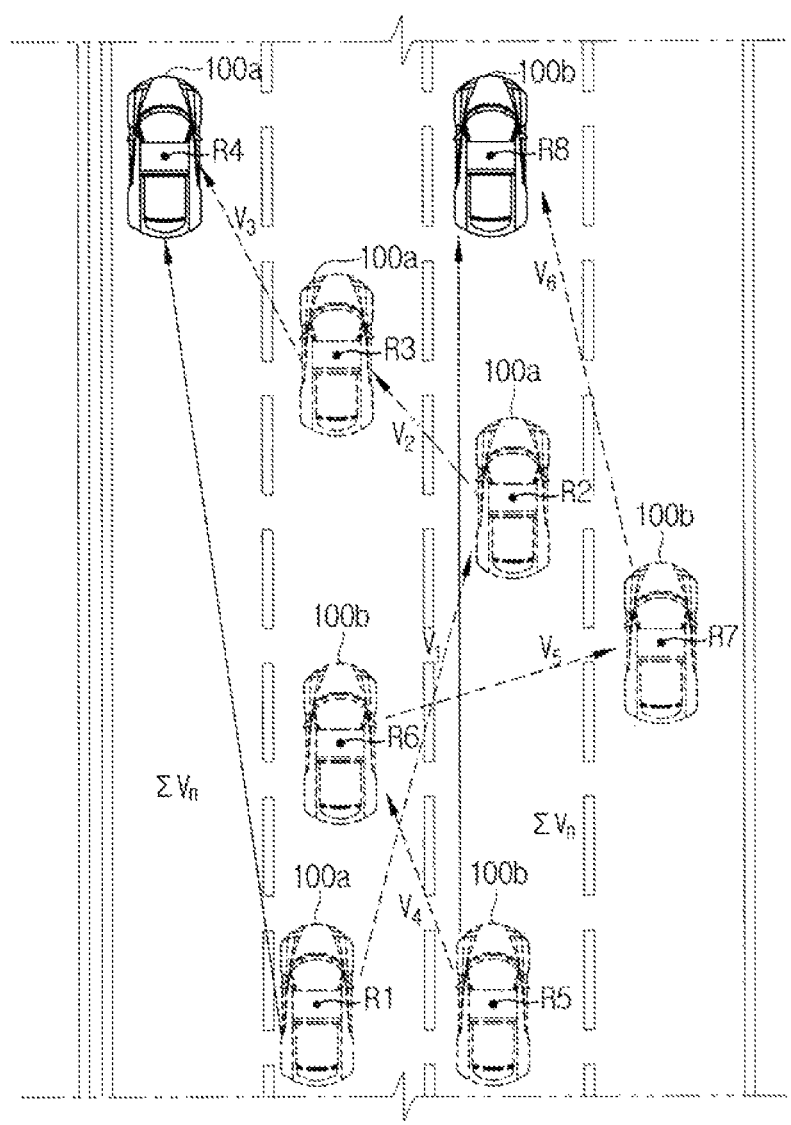
FIG. 13 is a view for describing an example of calculating a driving probability in a link based on driving vectors.

FIG. 13 is a view for describing an example of calculating a driving probability in a link based on driving vectors.

The driving probability-in-link calculator 127 may reflect a type of a node located in front of a vehicle 100a or 100b (also, referred to as a first vehicle 100a or a second vehicle 100b) and driving vectors V1 to V6 of the vehicle 100a or 100b to calculate a driving probability for each route.

When the vehicle 100a or 100b travels on a road, a node n2, for example, a four-way intersection may exist in front of the vehicle 100a or 100b. In this case, the vehicle 100a or 100b may change a lane L1 to L4 (also, referred to as a first lane L1, a second lane L2, a third lane L3, and a fourth lane L4), as shown in FIG. 13. For example, the first vehicle 100a may move from a first position R1 to a fourth position R4 in such a way to enter the second lane L2, the third lane L3, the second lane L2, and the first lane L1, sequentially. In this case, the driving probability-in-link calculator 127 may calculate a driving probability for each route, based on driving vectors V1, V2, and V3 of the vehicle 100a for the positions R1 to R4, calculated by the driving vector calculator 121c. More specifically, the driving probability-in-link calculator 127 may calculate a sum $\Sigma V_{n1}$ of the driving vectors V1 to V3, and predict a driving intention of the first vehicle 100a based on the orientation of the sum $\Sigma V_{n1}$ of the driving vectors V1 to V3. If the first vehicle 100a moves as shown in FIG. 13, the sum $\Sigma V_{n1}$ of the driving vectors V1, V2, and V3 of the first vehicle 100a may have the orientation of a left-forward direction, so that the driving probability-in-link calculator 127 may reflect the orientation of the sum $\Sigma V_{n1}$ of the driving vectors V1, V2, and V3 to decide a high probability that the first vehicle 100a turns left at the four-way intersection n2 and a low probability that the first vehicle 100b goes straight or turns right at the four-way intersection n2. Also, the second vehicle 100b may move from a fifth position R5 to a sixth position R6, a seventh position R7, and an eighth position R8, sequentially. In this case, the second vehicle 100b may move from the third lane L3 to the second lane L2, the fourth lane L4, and the third lane L3, sequentially. In this case, a sum $\Sigma V_{n2}$ of driving vectors V4, V5 and V6 for the individual positions R5 to R6 may have the orientation of a forward direction, so that the driving probability-in-link calculator 127 may reflect the sum $\Sigma V_{n2}$ of the driving vectors V4, V5, and V6 to decide a high probability that the second vehicle 100b goes straight at the four-way intersection n2 and a low probability that the second vehicle 100b turns left or right at the four-way intersection n2.

As such, when the vector sum $\Sigma V_{n1}$ or $\Sigma V_{n2}$ is used, the driving probability-in-link calculator 127 may calculate a driving probability in each link according to Equation (2), below.

$$P_{link} = F(\text{NodeType}, f(V_1, V_2, \ldots V_n)) \quad (2)$$

In Equation (1), $P_{link}$ represents a driving probability in a predetermined link, Node Type represents a type of a node, f( ) is a function for calculating a sum of vectors, and $V_1$ to $V_n$ represent driving vectors for individual positions. Also, F( ) is a function for calculating a driving probability according to the above variables. In other words, a driving probability in a predetermined link may be decided based on a node in front, and a sum of driving vectors before the vehicle enters the node in front. The F( ) function of Equation (2) may be arbitrarily decided according to a designer's selection, for example, according to experience rule.

The driving probability-for-route calculator 128 may calculate driving probabilities for all possible routes based on driving probabilities for links calculated by the driving probability-in-link calculator 127 to thereby acquire predicted driving information. More specifically, the driving probability-for-route calculator 128 may combine driving probabilities for individual links connected to nodes, calculated by the driving probability-in-link calculator 127 to calculate driving probabilities for all routes along which the vehicle 100 can travel.

Figure 14:
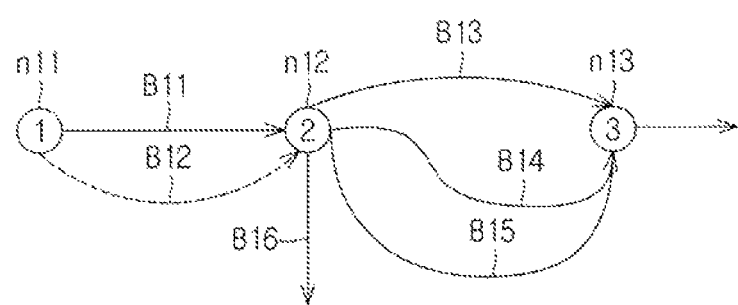
FIG. 14 is a view for describing an example of calculating a driving probability for each of routes for moving to a destination.

FIG. 14 is a view for describing an example of calculating a driving probability for each of routes for moving to a destination.

As shown in FIG. 14, on a road where the vehicle 100 is actually traveling, a plurality of nodes n11 to n13 and a plurality of links B11 to B16 may exist. When the vehicle 100 moves from a node n11 (also, referred to as a current node n11) corresponding to a current position of the vehicle 100 to a destination node n13, the vehicle 100 may move from the current node n11 to the destination node n13 via an intermediate node n12. In this case, the vehicle 100 may move from the current node n11 to the intermediate node n12 via any one link of two links B11 and B12, and then move to the destination node n13 via any one link B13, B14, or B15 of a plurality of links B11 to B15 connected to the intermediate node n12. The driving probability-for-route calculator 128 may calculate all drivable routes of the vehicle 100 based on driving probabilities for the individual links B11 to B15 connected to the plurality of successive nodes n11 to n13.

The driving probability-for-route calculator 128 may calculate driving probabilities for all the drivable routes of the vehicle 100 using one of various algorithms. For example, the driving probability-for-route calculator 128 may calculate driving probabilities for all the drivable routes of the vehicle 100 using an Electronic Horizon (EH) method.

When driving probabilities for all the drivable routes of the vehicle 100 are calculated using the EH method, a driving probability $I_{link}$ for a route to a specific link may be defined as a production of a driving probability $I_{plink}$ for routes to a link preceding the specific link right ahead and a driving probability $P_{link}$ of the specific link in which the vehicle 100 is located currently, as expressed by Equation (3), below.

$$I_{link} = I_{plink} \times P_{link} \quad (3)$$

If the specific link is an initial node having no link located behind, the driving probability $I_{plink}$ for t routes to a link preceding the specific link right ahead may be defined as 1.

More specifically, for example, referring to FIG. 14, if a probability that the vehicle 100 travels from an 11-th node n11 to an 11-th link B11 among a plurality of selectable links B11 and B12 is 0.6 and a probability that the vehicle 100 travels to the 12-th link B12 is 0.4, a driving probability $I_{link11}$ for each route in the 11-th link B11 may be given as 0.6. Also, if a driving probability for a 13-th link B13 connected to a 12-th node n12 is given as 0.1, a driving probability $I_{link13}$ for each route in the 13-th link B13 may be calculated as 0.06 ($I_{link13} = I_{link11} * P_{link13} = 0.6*0.1 = 0.06$). Likewise, if driving probabilities for links connected to the 12-th node n12, that is, a 14-th link B14, a 15-th link B15, and a 16-th link B16 are given as 0.3, 0.2, and 0.4, respectively, a driving probability $I_{link14}$ for each route in the 14-th link B14 may be calculated as 0.18, a driving probability $I_{link15}$ for each route in the 15-th link B15 may be calculated as 0.12, and a driving probability $I_{link16}$ for each route in the 16-th link B16 may be calculated as 0.24. In this case, a sum of the driving probabilities $I_{link13}$ to $I_{link16}$ for each route in the 13-th to 16-th links B13 to B16 may be equal to the driving probability $I_{link11}$ for each route in the 11-th link B11.

In this way, the driving probability calculator 126 may calculate a driving probability for each of routes along which the vehicle 100 can travel. The driving probabilities for the routes calculated by the driving probability calculator 126 may be stored in the storage unit 140, or displayed on the display unit 152 of the user interface unit 150 under the control of the controller 110. Also, a driving probability for each of routes of the vehicle 100 calculated by the driving probability calculator 126 may be transmitted to the server apparatus 200 through the communication unit 160.

An example in which the vehicle-mounted display apparatus 109 calculates driving probabilities has been described above. However, in other forms, operation of calculating driving probabilities may be performed by the vehicle controller 101. In this case, the vehicle controller 101 may include at least one of the controller 110, the position information acquiring unit 138, the main memory 139, the storage unit 140, the user interface 150, and the communication unit 160, as shown in FIG. 3, and may further include the user interface 150 as necessary. The controller 110, the position information acquiring unit 138, the main memory 139, the storage unit 140, the user interface 150, and the communication unit 160 of the vehicle-mounted display apparatus 109 may be the same as the controller 110, the position information acquiring unit 138, the main memory 139, the storage unit 140, the user interface 150, and the communication unit 160 of the vehicle controller 101, or may be modified from the controller 110, the position information acquiring unit 138, the main memory 139, the storage unit 140, the user interface 150, and the communication unit 160 of the vehicle controller 101, within a range that can be considered by a designer. If the vehicle controller 101 includes the controller 110, the position information acquiring unit 138, the main memory 139, the storage unit 140, and the communication unit 160, the vehicle-mounted display apparatus 109 may be omitted. In other words, although no vehicle-mounted display apparatus 109 is installed in the vehicle 100, driving probabilities can be calculated by the vehicle controller 101, and the calculated driving probabilities may be transmitted to the server apparatus 200, as described above.

Hereinafter, the server apparatus 200 will be described in detail.

Figure 15:
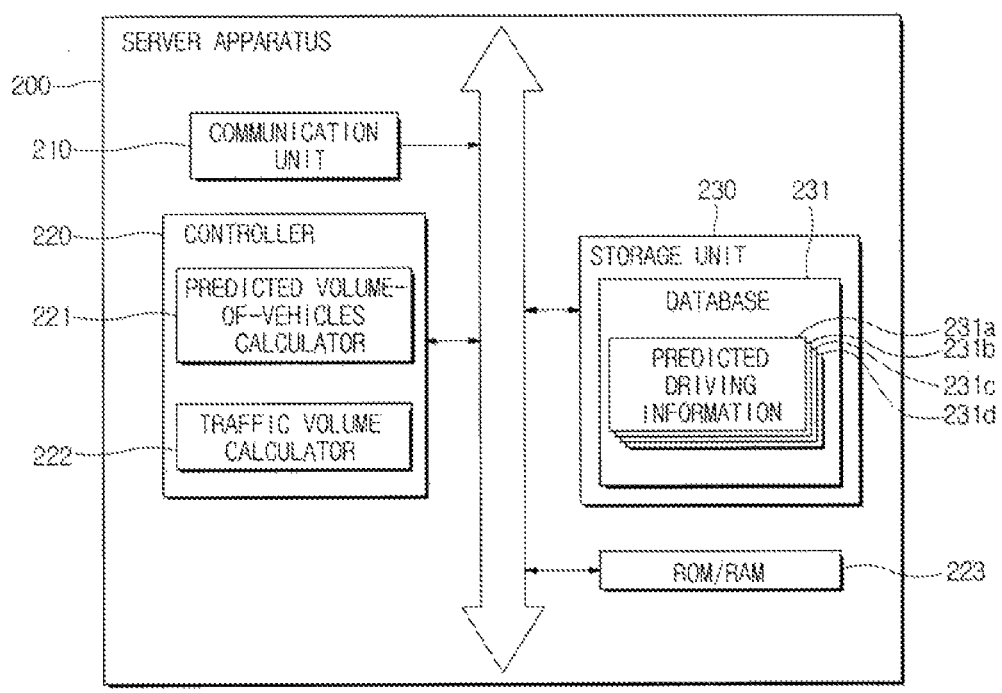
FIG. 15 is a control block diagram of a server apparatus.
Figure 16:
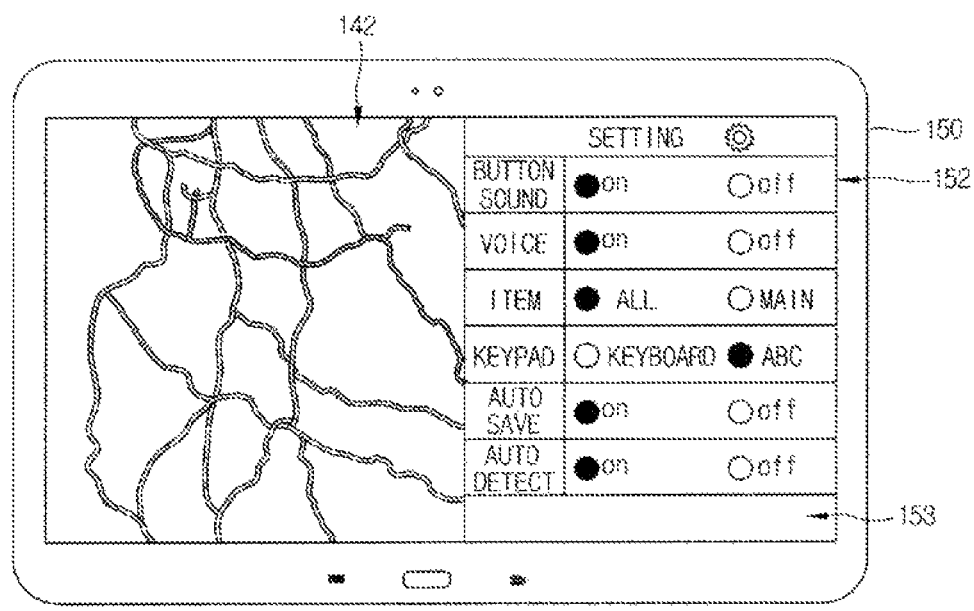
FIG. 16 shows an example of a map to which traffic volume information acquired by a server apparatus is reflected.

FIG. 15 is a control block diagram of the server apparatus 200, and FIG. 16 shows an example of a map to which traffic volume information acquired by the server apparatus 200 is reflected.

In some forms, the server apparatus 200 may include a communication unit 210, a controller 220, a main memory 223, and a storage unit 230.

The communication unit 210 may be configured to communicate with the communication unit 160 of the vehicle 100 to transmit/receive data to/from the vehicle controller 101 or the vehicle-mounted display apparatus 109. The communication unit 210 may receive a driving probability for each link and/or a driving probability for each drivable route, calculated by the predicted driving information acquiring unit 120, or may transmit information about a volume of traffic to the vehicle 100, another server apparatus 98, and/or a terminal 99.

The controller 220 may control overall operations of the server apparatus 200. The controller 220 may be implemented with one or more semiconductor chips and related components.

In some forms, the controller 220 may include a predicted volume-of-vehicles calculator 221 and a traffic volume calculator 222.

The predicted volume-of-vehicles calculator 221 may calculate a predicted volume of vehicles for each route, based on driving probabilities for drivable routes received from a plurality of vehicles 100a to 100d through the communication unit 210. In some forms, the predicted volume-of-vehicles calculator 221 may calculate a predicted volume of vehicles for each link using driving probabilities for the link to calculate a predicted volume of vehicles for each route based on driving probabilities for the route. In this case, the predicted volume-of-vehicles calculator 221 may calculate a predicted volume of vehicles for a specific route in consideration of probabilities that a plurality of vehicles enter the specific route. Also, the predicted volume-of-vehicles calculator 221 may calculate a predicted volume of vehicles for each route using various methods that can be considered by a designer. For example, the predicted volume-of-vehicles calculator 221 may calculate a predicted volume of vehicles for a specific route after adding a predetermined weight value to a probability that each vehicle enters the specific route. Herein, the predetermined weight value may be defined to reflect factors, such as road conditions or drivers' driving patterns.

The predicted volume of vehicles may be a positive (+) value or a negative (−) value. If the predicted volume of vehicles is a positive value, it means that the volume of vehicles entering the specific route is more than the volume of vehicles exiting the specific route, and if the predicted volume of vehicles is a negative value, it means that the volume of vehicles entering the specific route is less than the volume of vehicles exiting the specific route.

In some forms, the predicted volume-of-vehicles calculator 221 may calculate a predicted volume of vehicles for each route, using Equation (4), below.

$$U_{predicted} = \Sigma f_{route}(P_x(\text{route}), t_e) \quad (4)$$

In Equation (4), $U_{predicted}$ represents a predicted volume of vehicles for each route, x represents an identification number for identifying each vehicle, wherein x is smaller than n (n is a natural number greater than 1), route represents an identification number for identifying each route, $P_x(route)$ represents a driving probability that a x-th vehicle travels along a specific route, and $t_e$ represents a time at which the vehicle enters the specific route according to average speed for the route.

In this case, since the vehicle 100 cannot exist on two routes at the same time, the volume of vehicles for each route may be decided based on a driving probability for a route on which the vehicle 100 can exist, without using a driving probability for a route on which the vehicle 100 cannot exist, at the time at which the vehicle 100 enters the route. More specifically, when the vehicle 100 does not arrive at a specific link yet, the vehicle 100 may be not used in calculating the volume of vehicles for the specific link. Also, when the vehicle 100 traveling along a specific link departs from the specific link to move to another link, the vehicle 100 may be not used in calculating the volume of vehicles for the specific link.

Meanwhile, a time at which the vehicle 100 enters a route may be calculated in consideration of average driving speed of the vehicle 100. More specifically, a time at which the vehicle 100 enters a specific route may be calculated according to Equation (5), below.

$$t_{en} = t_{ep} = (L_B/V_C) \quad (5)$$

In Equation (5), $t_{en}$ represents a time at which the vehicle 100 enters the next route, $t_{ep}$ represents a time at which the vehicle 100 entered the previous route, $L_B$ represents a distance of the correspond route, and $V_C$ represents speed of the vehicle 100.

In this way, the predicted volume-of-vehicles calculator 221 may calculate a predicted volume of vehicles for each route based on driving probabilities for drivable routes. In this case, the predicted volume-of-vehicles calculator 221 may be set to calculate a predicted volume of vehicles for each link based on driving probabilities for the link.

The calculated volume of vehicles may be transferred to the traffic volume calculator 222.

The traffic volume calculator 222 may calculate a volume of traffic for a specific route based on the predicted volume of vehicles. The volume of traffic may be a volume of traffic for the specific route, predicted after a predetermined time period has elapsed. The volume of traffic for the specific route may include a volume of traffic for a specific link.

In some forms, the traffic volume calculator 222 may calculate a volume of traffic for a specific route, using Equation (6), below.

$$T_{nxt} = T_{previous} U_{predicted} \quad (6)$$

In Equation (6), $T_{nxt}$ represents a volume of traffic for each route at a specific time, $T_{previous}$ represents a volume of traffic for each route at the previous time, and $U_{predicted}$ represents a volume of vehicles predicted for each route, as in Equation (4).

The server apparatus 200 may calculate predicted driving speed for a specific route, that is, for at least one specific road using the calculated volume of traffic for the specific route. In this case, the controller 220 of the server apparatus 200 may reflect a characteristic of the road, for example, the number of lanes or a road type to calculate driving speed of the vehicle 100 for the specific route. Also, the controller 220 of the server apparatus 200 may calculate a degree of congestion for the specific route, and estimate predicted driving speed of the vehicle 100 using information about driving speed corresponding to the calculated degree of congestion.

Information about the volume of traffic and/or information about the predicted driving speed for the specific route may be transmitted to the vehicle 100, the vehicle-mounted display apparatus 109, the other server apparatus 98, and/or the terminal 99 through the communication unit 210.

The vehicle 100, the vehicle-mounted display apparatus 109, the other server apparatus 98, and/or the terminal 99 may display the information about the volume of traffic and/or the information about the predicted driving speed for a user. In this case, the information about the volume of traffic and/or the information about the predicted driving speed may be combined with a map, and the combined result may be processed and then displayed for a user. For example, the vehicle-mounted display apparatus 109 of the vehicle 100 may display a map 142 to which the predicted volume of traffic is reflected on a screen 153, through the display unit 152 of the user interface 150, as shown in FIG. 16. The user may see the map 142 to which the predicted volume of traffic is reflected to visually acquire information about the volume of traffic, and then drive the vehicle 100 based on the acquired information. Also, the vehicle 100 or the vehicle-mounted display apparatus 109 may set a route to a destination based on the information about the volume of traffic and/or the information about the predicted driving speed. If there is an already set route to the destination, the vehicle 100 or the vehicle-mounted display apparatus 109 may cancel the already set route to the destination, and set a new route to the destination based on the information about the volume of traffic and/or the information about the predicted driving speed.

The main memory 223 may be implemented with RAM or ROM, and may temporarily or non-temporarily store various data required for operations of the controller 110.

The storage unit 230 may be configured to store various information required for operations of the server apparatus 200. In some forms, the storage unit 230 may store database 231 established with information about driving probabilities for drivable routes of each vehicle 100, received from the vehicle 100. In this case, the database 231 may be configured with predicted driving information 231a to 231d that is information about drivable routes for a plurality of vehicles 100a to 100d, received respectively from the plurality of vehicles 100a to 100d. The predicted driving information 231a to 231d may include information about driving probabilities for at least one route. Also, the storage unit 230 may store various information acquired by the controller 220, and also store various information (for example, map information) required for the controller 220 to calculate a predicted volume of vehicles or a volume of traffic. The storage unit 230 may be implemented as various storage medium capable of storing data, such as a semiconductor storage unit, an optical disc storage unit, a magnetic disc storage unit, or a magnetic tape storage unit.

Hereinafter, a traffic prediction method will be described with reference to FIGS. 17 to 19.

Figure 17:
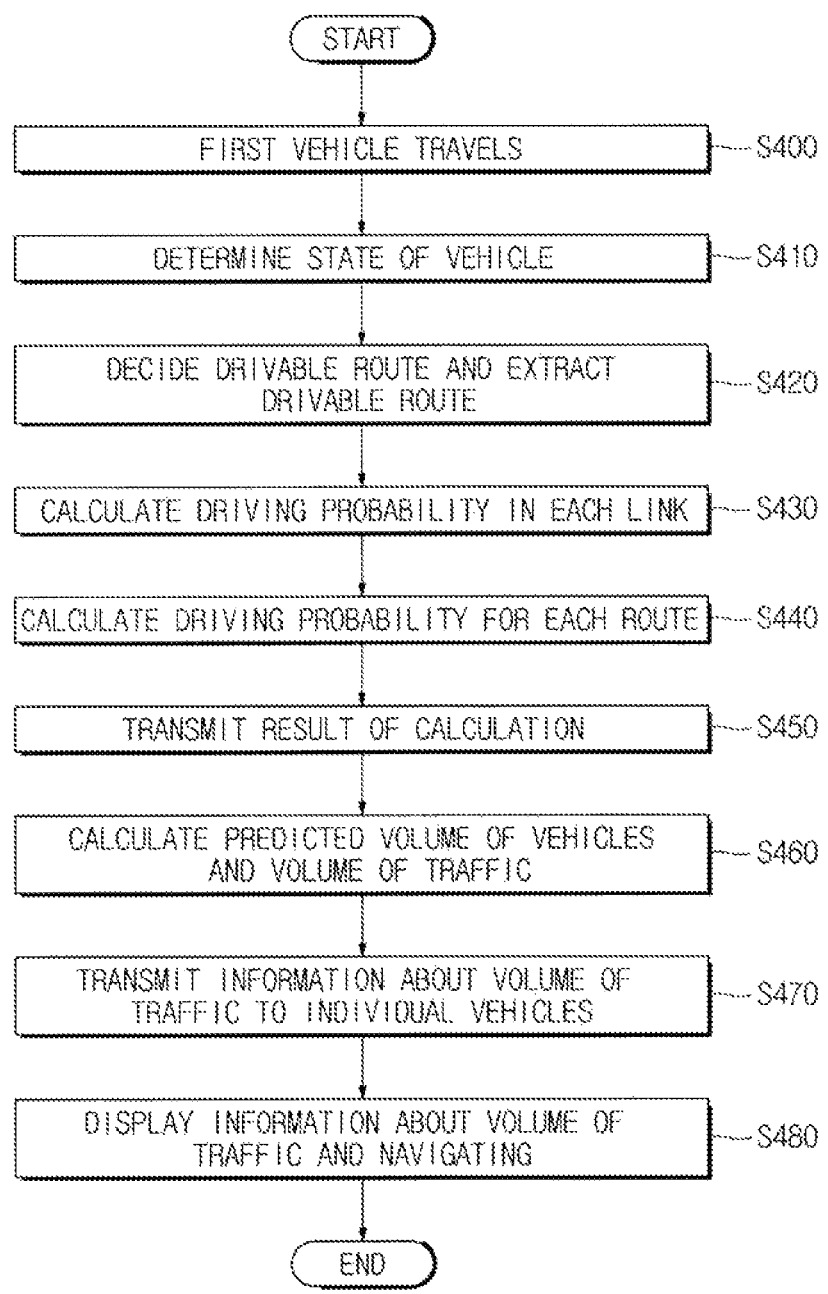
FIG. 17 is a first flowchart illustrating a form of a traffic prediction method.

FIG. 17 is a first flowchart illustrating a traffic prediction method.

According to the traffic prediction method as shown in FIG. 17, first, at least one vehicle among a plurality of vehicles, for example, a first vehicle may travel on a specific road, in operation S400.

When the first vehicle travels on the specific road, a vehicle controller or a controller of a vehicle-mounted display apparatus installed in the first vehicle may collect various information related to the states of the first vehicle, and determine a driving state of the first vehicle based on the collected information, according to a predetermined setting or a user's manipulation, in operation S410. For example, the vehicle controller or the controller of the vehicle-mounted display apparatus installed in the first vehicle may acquire coordinates corresponding to the position of the first vehicle using a vehicle position information acquiring unit such as GPS, and calculate driving vectors based on the acquired coordinates. Also, the vehicle controller or the controller of the vehicle-mounted display apparatus installed in the first vehicle may extract lines from an image photographed by a camera to acquire information about a driving lane, and acquire a lane change history created based on information about changes of driving lanes.

Figure 18:
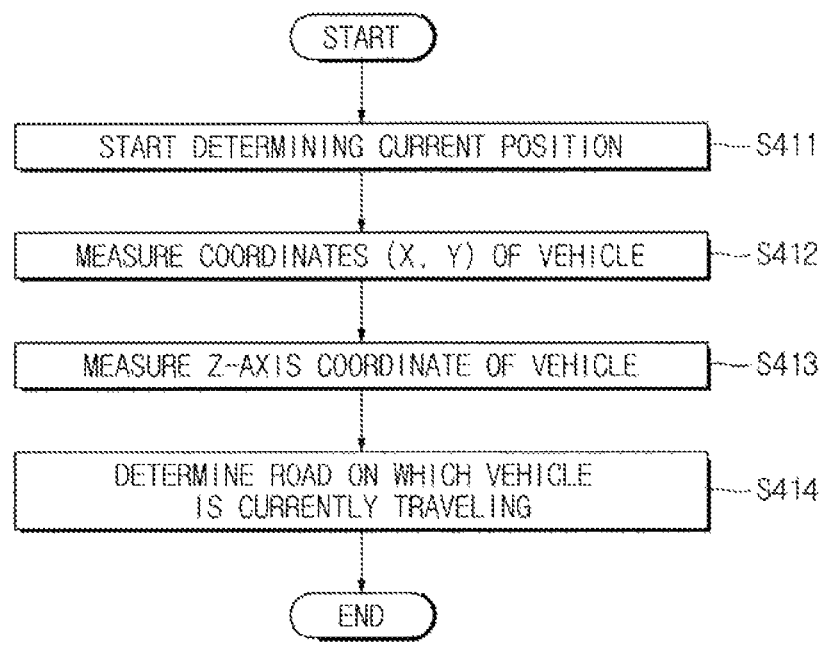
FIG. 18 is a second flowchart illustrating a form of a traffic prediction method.

FIG. 18 is a second flowchart illustrating a traffic prediction method.

As shown in FIG. 18, operation S410 of determining the driving state of the first vehicle may include operation S411 of starting determining the current position of the first vehicle, operation S412 of measuring 2D coordinates (X, Y) of the first vehicle, operation S413 of measuring an altitude, that is, a Z-axis coordinate of the first vehicle using the 2D coordinates (X, Y) of the first vehicle and a 3D map, and operation S414 of determining a road on which the first vehicle is currently traveling based on the acquired 3D coordinates (X, Y, Z) of the first vehicle to determine a current state of the first vehicle.

Figure 19:
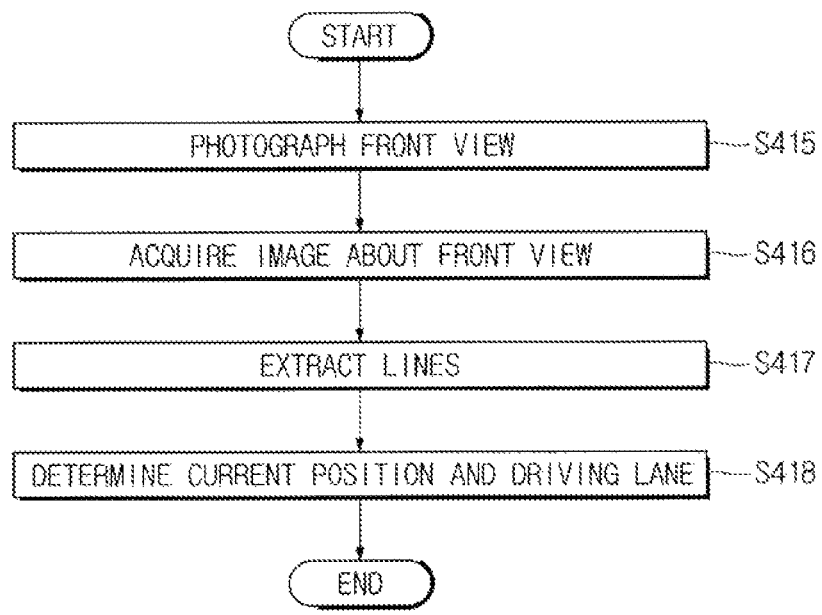
FIG. 19 is a third flowchart illustrating a form of a traffic prediction method.

FIG. 19 is a third flowchart illustrating a traffic prediction method. As shown in FIG. 19, operation S410 of determining the driving state of the first vehicle may include operations S415 and S416 of at a camera installed in the first vehicle, photographing a front view of the first vehicle to acquire an image about the front view of the first vehicle, operation S417 of extracting lines from the acquired image, and operation S418 of determining a driving lane on which the first vehicle is currently traveling based on the extracted lines. In this case, operation S418 of determining the driving lane on which the first vehicle is currently traveling based on the extracted lines may be performed by additionally using the 3D coordinates (X, Y, Z) of the first vehicle acquired in operations S412 and S413.

Operations S411 to S414 and S415 to S418 shown in FIGS. 18 and 19 may be performed sequentially or simultaneously. Also, some of operations S411 to S414 and S415 to S418 may be omitted.

If the driving state of the vehicle is determined, a drivable route may be extracted. At this time, a drivable range may be first decided as necessary, and a drivable route may be extracted within the drivable range, in operation S420. The drivable range may include a drivable area that is a group of areas in which a vehicle can travel in a predetermined time period. The drivable route which is a route along which a vehicle is determined to be able to travel in future may be extracted in consideration of a road on which the vehicle is currently traveling, coordinate values about a current position of the vehicle, and map information. In some forms, the drivable route may be acquired based on a type of a road around or near the vehicle, extracted from map information and information about a current position of the vehicle. Also, the drivable route may be acquired using map information, and at least one among a road on which the vehicle is currently traveling, coordinate values of a current position of the vehicle, a lane on which the vehicle is currently traveling, driving vectors of the vehicle, and a lane change history of the vehicle. In order to extract the drivable route, In some forms, topology may be used. In this case, the drivable route may be conceptually acquired by a combination of extracted nodes and links.

If the drivable route is extracted, a driving probability in each link may be calculated, in operation S430. In some forms, the driving probability in each link may be calculated based on information about the drivable route and the lane change history, or based on the information about the drivable route and the driving vectors.

If the driving probability in each link is calculated, a driving probability for each route may be calculated based on the driving probability for each link, in operation S440. For example, the driving probability for each route may be calculated by combining driving probabilities for one or more links existing in the route. In some forms, the EH method may be used to calculate the driving probability for each route.

At least one of the driving probability for each link and the driving probability for each route may be displayed for a user through a vehicle-mounted display apparatus, according a predetermined setting or a user's selection.

The at least one of the driving probability for each link and the driving probability for each route may be transmitted to a server apparatus, in operation S450.

The server apparatus may calculate a predicted volume of vehicles for a specific route based on the at least one of the driving probability for each link and the driving probability for each route, and reflect the predicted volume of vehicles to an already acquired volume of traffic, thereby calculating a predicted volume of traffic after a predetermined time period elapses, in operation S460.

The server apparatus may transmit information about the volume of traffic to individual vehicles, for example, a first vehicle and a second vehicle that is different from the first vehicle, in operation S470. The server apparatus may also transmit the information about the volume of traffic to another server apparatus or a predetermined terminal, as necessary.

The first and second vehicles may provide the received information about the volume of traffic to users, in operation S480. Also, the first and second vehicles may set a route to a destination based on the received information about the volume of traffic, and provide information about the set route to the users, thereby guiding the users.

The traffic prediction method described above may be implemented using the above-described vehicle or the vehicle-mounted display apparatus installed in the vehicle, and the server apparatus connected to the vehicle or the vehicle-mounted display apparatus installed in the vehicle. In this case, operations S400 to S450 of the traffic prediction method may be implemented by controlling the vehicle-mounted display apparatus or the vehicle. Accordingly, operations S400 to S450 of the traffic prediction method may be applied to a method of controlling the vehicle-mounted display apparatus and a method of controlling the vehicle, without any modifications or through modifications that can be considered by a designer.

The traffic prediction method, the method of controlling the vehicle-mounted display apparatus, and the method of controlling the vehicle may be implemented in the form of a program which can be driven by various computer devices. The program may include, alone or in combination with program instructions, data files, data structures, and the like. The program may be designed or written using higher level language code that may be executed by a computer using an interpreter, as well as machine code, such as produced by a compiler. The program may be specially designed for implementing the method of controlling the display apparatus as described above, or may be implemented using various functions or definitions well-known and available to those of ordinary skill in the computer software arts.

The program for implementing the traffic prediction method, the method of controlling the vehicle-mounted display apparatus, and the method of controlling the vehicle may be recorded in computer-readable recording medium. The computer-readable recording medium may include various kinds of hardware devices capable of storing a specific program that is executed according to a call from a computer or the like, such as magnetic disk storage media (for example, a hard disk or a floppy disk), optical media (for example, a magnetic tape, a Compact Disk (CD), or Digital Video Disc (DVD)), magneto-optical media (for example, a floptical disk), and a semiconductor storage device (for example, ROM, RAM, or a flash memory).

According to the traffic prediction system, the vehicle-mounted display apparatus, and the traffic prediction method, as described above, by detecting a route having a highest driving probability along which a vehicle can travel, and accurately predicting a volume of traffic based on the result of the detection, it is possible to provide traffic information optimized for users such as drivers.

According to the traffic prediction system, the vehicle-mounted display apparatus, the vehicle, and the traffic prediction method, as described above, since information about a predicted volume of traffic at a current time, instead of information about a volume of traffic at the previous time, can be provided to users, it is possible to improve non-realtime of the traffic prediction method, and to set an appropriate route to a destination by reflecting the information about the predicted volume of traffic.

According to the traffic prediction system, the vehicle-mounted display apparatus, the vehicle, and the traffic prediction method, as described above, a volume of traffic can be accurately estimated even when an exceptional situation occurs, like when a destination or a driving route of a probe car is not known or when a probe car departs from a set route to travel along another route although a specific destination or a driving route was already set, thereby providing a user with accurate information about the volume of traffic and a route to a destination to which the information about the volume of traffic is reflected.

According to the traffic prediction system, the vehicle-mounted display apparatus, the vehicle, and the traffic prediction method, as described above, it is possible to prevent received information about the volume of traffic from mismatching with the volume of traffic felt by a driver or a passenger when the driver's vehicle actually travels on a specific road.

Although a few forms of the present disclosure have been shown and described, it would be appreciated by those skilled in the art that changes may be made in these forms without departing from the principles and spirit of the disclosure, the scope of which is defined in the claims and their equivalents.

What is claimed is:

1. A traffic prediction system comprising:
   a server apparatus configured to:
      receive a driving probability for at least one drivable route from a vehicle configured to acquire the driving probability for the at least one drivable route;
      retrieve, from a database, a road network data structure comprised of nodes and links, wherein the nodes represent at least one of a straight road, an intersection, an overpass, a underpass, an exit, or a rotary within an area;
      calculate a volume of traffic for the at least one drivable route using the driving probability for the at least one drivable route, wherein the vehicle is configured to calculate a driving probability for the at least one drivable route based on the road network data structure;
      calculate a predicted volume of vehicles for each link based on the driving probability for each link and an entering time point of vehicles for each link;
      calculate the volume of traffic for the at least one drivable route based on the predicted volume of vehicles for each link;
      decide a route existing in a range to which the vehicle is able to travel for a predetermined time period;
      retrieve, from the database, map information corresponding to a three-dimensional map, wherein the map information includes a three-dimensional coordinate identifying a location of the vehicle; and
      acquire a driving probability for the route existing in the range based on the map information.

2. The traffic prediction system according to claim 1, wherein the vehicle is configured to calculate the driving probability for each link by further considering a lane change history of the vehicle.

3. The traffic prediction system according to claim 1, wherein the at least one drivable route includes a route existing in a range to which the vehicle is able to travel for a predetermined time period.

4. The traffic prediction system according to claim 1, wherein the server apparatus is configured to transmit information about the volume of traffic to the vehicle.

5. The traffic prediction system according to claim 1, further comprising a terminal configured to receive information about the volume of traffic from the server apparatus.

6. The traffic prediction system according to claim 1, wherein the vehicle comprises a vehicle-mounted display apparatus configured to acquire the driving probability for the at least one drivable route.

7. A traffic prediction system comprising:
   a server apparatus configured to:
      receive a driving probability for at least one drivable route from a vehicle configured to acquire the driving probability for the at least one drivable route, wherein the vehicle is configured to acquire an image about a front view of the vehicle, to extract lines from the image to acquire information about lanes, and to acquire a lane change history based on the information about the lanes;
      retrieve, from a database, a road network data structure comprised of nodes and links representing roads within an area;
      calculate a volume of traffic for the at least one drivable route using the driving probability for the at least one drivable route, wherein the vehicle is configured to calculate the driving probability for the at least one drivable route based on the road network data structure;
   wherein the server apparatus is further configured to:
      calculate a predicted volume of vehicles for each link based on the driving probability for each link and an entering time point of vehicles for each link;
      calculate the volume of traffic for the at least one drivable route based on the predicted volume of vehicles for each link;

decide a route existing in a range to which the vehicle is able to travel for a predetermined time period;

retrieve, from the database, map information corresponding to a three-dimensional map, wherein the map information includes a three-dimensional coordinate identifying a location of the vehicle; and acquire a driving probability for the route existing in the range based on the map information and the lane change history.

8. A traffic prediction system comprising:

a server apparatus configured to:

receive a driving probability for at least one drivable route from a vehicle configured to acquire the driving probability for the at least one drivable route;

retrieve, from a database, a road network data structure comprised of nodes and links representing roads within an area;

calculate a volume of traffic for the at least one drivable route using the driving probability for the at least one drivable route, wherein the vehicle is configured to calculate a driving probability for the at least one drivable route in the road network using driving vectors of the vehicle;

wherein the server apparatus is further configured to:

calculate a predicted volume of vehicles for each link based on the driving probability for each link and an entering time point of vehicles for each link;

calculate the volume of traffic for the at least one drivable route based on the predicted volume of vehicles for each link;

decide a route existing in a range to which the vehicle is able to travel for a predetermined time period;

retrieve, from the database, map information corresponding to a three-dimensional map, wherein the map information includes a three-dimensional coordinate identifying a location of the vehicle; and acquire a driving probability for the route existing in the range based on the map information.

9. The traffic prediction system according to claim 8, wherein the vehicle is configured to acquire information about a position of the vehicle several times, and configured to acquire the driving vectors of the vehicle based on the information about the position of the vehicle.

10. The traffic prediction system according to claim 8, wherein the three-dimensional coordinate includes an altitude of the vehicle.

11. A traffic prediction system comprising:

a server apparatus configured to:

receive a driving probability for at least one drivable route from a vehicle configured to acquire the driving probability for the at least one drivable route;

retrieve, from a database, a road network data structure comprised of nodes and links representing roads within an area;

calculate a volume of traffic for the at least one drivable route using the driving probability for the at least one drivable route;

wherein the vehicle is configured to calculate a driving probability for for the at least one drivable route based on the road network data structure;

wherein the server apparatus is configured to calculate a predicted volume of vehicles for each link based on the driving probability for each link and an entering time point of vehicles for each link, and configured to calculate the volume of traffic for the at least one drivable route based on the result of the calculation;

retrieve, from the database, map information corresponding to a three-dimensional map, wherein the map information includes a three-dimensional coordinate identifying a location of the vehicle; and wherein the server apparatus is configured to decide a route existing in a range to which the vehicle is able to travel for a predetermined time period, and acquire a driving probability for the route existing in the range based on the map information.

12. A traffic prediction system comprising:

a server apparatus configured to:

receive a driving probability for at least one drivable route from a vehicle configured to acquire the driving probability for the at least one drivable route;

retrieve, from a database, a road network data structure comprised of nodes and links representing roads within an area;

calculate a volume of traffic for the at least one drivable route using the driving probability for the at least one drivable route;

wherein the vehicle is configured to calculate a driving probability for the at least one drivable route based on the road network data structure;

wherein the vehicle is configured to calculate a driving probability for each route included in the road network using the driving probability for the at least one link; and wherein the server apparatus is further configured to:

calculate a predicted volume of vehicles for each link based on the driving probability for each link and an entering time point of vehicles for each link;

calculate the volume of traffic for the at least one drivable route based on the predicted volume of vehicles for each link;

decide a route existing in a range to which the vehicle is able to travel for a predetermined time period;

retrieve, from the database, map information corresponding to a three-dimensional map, wherein the map information includes a three-dimensional coordinate identifying a location of the vehicle; and acquire a driving probability for the route existing in the range based on the map information.

13. The traffic prediction system according to claim 12, wherein the vehicle is configured to calculate the driving probability for each route using an Electronic Horizon (EH) method.

14. The traffic prediction system according to claim 12, wherein the server apparatus is configured to calculate a predicted volume of vehicles based on the driving probability for each route, and the vehicle is configured to calculate the volume of traffic for the at least one drivable route based on the result of the calculation.

* * * * *